(12) United States Patent
Elsayed

(10) Patent No.: US 12,245,163 B1
(45) Date of Patent: Mar. 4, 2025

(54) METHOD AND SYSTEM FOR TRANSMISSION POWER CONTROL IN BLUETOOTH LOW ENERGY CONTROLLERS

(71) Applicant: Synopsys, Inc., Sunnyvale, CA (US)

(72) Inventor: Khaled M. F. Elsayed, Giza (EG)

(73) Assignee: Synopsys, Inc., Sunnyvale, CA (US)

( * ) Notice: Subject to any disclaimer, the term of this patent is extended or adjusted under 35 U.S.C. 154(b) by 313 days.

(21) Appl. No.: 17/875,228

(22) Filed: Jul. 27, 2022

Related U.S. Application Data

(60) Provisional application No. 63/226,066, filed on Jul. 27, 2021.

(51) Int. Cl.
*H04W 52/24* (2009.01)
*H04W 52/36* (2009.01)

(52) U.S. Cl.
CPC ....... *H04W 52/245* (2013.01); *H04W 52/367* (2013.01)

(58) Field of Classification Search
CPC .......................... H04W 52/245; H04W 52/367
See application file for complete search history.

(56) References Cited

U.S. PATENT DOCUMENTS

| | | | | |
|---|---|---|---|---|
| 5,722,063 A | * | 2/1998 | Peterzell | H04B 1/109 455/287 |
| 5,805,994 A | * | 9/1998 | Perreault | H04W 52/50 455/435.1 |
| 6,256,476 B1 | * | 7/2001 | Beamish | H04W 52/283 455/574 |
| 6,684,062 B1 | * | 1/2004 | Gosior | A63F 13/20 455/66.1 |
| 7,389,088 B2 | | 6/2008 | Kim | |

(Continued)

FOREIGN PATENT DOCUMENTS

CN 103684550 B 1/2018

OTHER PUBLICATIONS

Jin, S., et al., "The Transmission Power Control Method for Wireless Sensor Networks Based on LQI and RSSI," In: Xiao, T., Zhang, L., Fei, M. (eds) AsiaSim 2012. AsiaSim 2012. Communications in Computer and Information Science, vol. 324. Springer, Berlin, Heidelberg, pp. 37-44.

(Continued)

*Primary Examiner* — Dominic E Rego
(74) *Attorney, Agent, or Firm* — Weaver Austin Villeneuve & Sampson LLP

(57) ABSTRACT

A method for dynamically adjusting transmit power of a first device that is in communication with a second device using a wireless communications protocol includes, in part, determining, by the second device, a received signal strength indication (RSSI) associated with a signal received from the first device; determining, by the second device, a first amount of power adjustment for the first device in accordance with the determined RSSI; transmitting the first amount of power adjustment from the second device to the first device; determining, by the first device, a second amount of power adjustment for the first device in accordance with the RSSI and the first amount of power adjustment; and changing a transmit power of the first device in accordance with the second amount of power adjustment.

20 Claims, 22 Drawing Sheets

(56) References Cited

U.S. PATENT DOCUMENTS

| | | | | |
|---|---|---|---|---|
| 7,697,643 | B2* | 4/2010 | Lomp | H04W 52/04 |
| | | | | 375/345 |
| 8,275,316 | B2 | 9/2012 | Ding | |
| 8,971,948 | B1* | 3/2015 | Breslin | H04B 7/04 |
| | | | | 455/25 |
| 10,296,064 | B2 | 5/2019 | Piipponen et al. | |
| 2007/0242621 | A1* | 10/2007 | Nandagopalan | H04W 74/0808 |
| | | | | 370/254 |
| 2008/0039128 | A1* | 2/2008 | Ostman | H04W 52/22 |
| | | | | 455/522 |
| 2009/0286496 | A1* | 11/2009 | Yavuz | H04W 52/367 |
| | | | | 455/226.2 |
| 2012/0329410 | A1* | 12/2012 | Balakrishnan | G06F 1/206 |
| | | | | 455/127.1 |
| 2013/0100878 | A1* | 4/2013 | Chen | H04W 52/0245 |
| | | | | 370/315 |
| 2013/0102309 | A1* | 4/2013 | Chande | H04W 52/325 |
| | | | | 455/435.1 |
| 2013/0229930 | A1* | 9/2013 | Akay | H04W 12/64 |
| | | | | 370/252 |
| 2014/0119220 | A1* | 5/2014 | Wang | H04W 52/367 |
| | | | | 370/252 |
| 2014/0274179 | A1* | 9/2014 | Zhu | H04W 52/243 |
| | | | | 455/509 |
| 2015/0296460 | A1* | 10/2015 | Lee | H04W 52/283 |
| | | | | 455/522 |
| 2017/0150455 | A1* | 5/2017 | Li | H04W 52/36 |
| 2018/0160373 | A1* | 6/2018 | Ravishankar | H04W 52/242 |
| 2019/0007910 | A1* | 1/2019 | Akula | H04W 52/365 |
| 2019/0037418 | A1* | 1/2019 | Gunasekara | H04W 52/40 |
| 2019/0174429 | A1* | 6/2019 | Wang | H04W 52/383 |
| 2019/0191387 | A1* | 6/2019 | Shakya | H04W 52/247 |
| 2019/0327687 | A1* | 10/2019 | Wang | H04W 72/0473 |
| 2020/0228953 | A1* | 7/2020 | Thoukydides | H04W 24/08 |
| 2020/0336993 | A1* | 10/2020 | Wang | H04W 72/0473 |
| 2020/0413448 | A1* | 12/2020 | Lai | H04B 17/318 |
| 2021/0235395 | A1* | 7/2021 | Zhang | H04B 7/0632 |
| 2021/0258894 | A1* | 8/2021 | Yao | H04W 52/50 |
| 2021/0392587 | A1* | 12/2021 | Lu | H04L 5/001 |
| 2022/0124643 | A1* | 4/2022 | Wang | H04W 52/245 |

OTHER PUBLICATIONS

Fazeli-Dehkordy, S., et al., "Multiple Peer-to-Peer Communications Using a Network of Relays," IEEE Transactions on Signal Processing, vol. 57, No. 8, Aug. 2009, pp. 3053-3062.

Lin, S., et al., "ATPC: Adaptive Transmission Power Control for Wireless Sensor Networks," SenSys '06, Nov. 1-3, 2006, 14 pp.

Kim, S., et al., "Link-State-Estimation-Based Transmission Power Control in Wireless Body Area Networks," IEEE Journal of Biomedical and Health Informatics, vol. 18, No. 4, Jul. 2014, pp. 1294-1302.

Xiao, S., et al., "Transmission Power Control in Body Area Sensor Networks for Healthcare Monitoring," IEEE JSAC: Special Issue on Body Area Networking, Feb. 2009, 12 pp.

Chincoli, M., et al., "Power Control in Wireless Sensor Networks with Variable Interference," Mobile Information Systems, vol. 2016, Article ID 3592581, 2016, 10 pp. http://dx.doi.org/10.1155/2016/3592581.

Young, S., et al., "Uplink Power Control in Bluetooth Transceiver," IFAC Proceedings vols. vol. 34, Issue 22, 2001, pp. 366-371, https://doi.org/10.1016/S1474-6670(17)32966-X.

Tahir, M., et al., "East: Energy-Efficient Adaptive Scheme for Transmission in Wireless Sensor Networks," 2013 26th IEEE Canadian Conference on Electrical and Computer Engineering (CCECE), 2013, pp. 1-4, doi: 10.1109/CCECE.2013.6567755.

Basu, D., et al., "Performance Comparison of a New Non-RSSI Based Wireless Transmission Power Control Protocol with RSSI Based Methods: Experimentation with Real World Data," International Journal of Engineering and Technology Innovation, vol. 6, No. 1, 2016, pp. 30-54.

* cited by examiner

METHOD AND SYSTEM FOR TRANSMISSION POWER CONTROL IN BLUETOOTH LOW ENERGY CONTROLLERS

RELATED APPLICATION

The present application claims benefit under 35 USC 119 (e) of U.S. Patent Application No. 63/226,066 filed Jul. 27, 2021, the content of which is incorporated herein by reference in its entirety.

TECHNICAL FIELD

The present disclosure relates to transmission power control in Bluetooth low energy (BLE) controllers.

BACKGROUND

The Bluetooth low energy 5.2 standard defines message formats and message processing rules at the end-points of a power control loop. Generally, a channel between two BLE end-points (e.g., BLE devices) fluctuates over time due to factors such as varying path losses caused by movement, varying channel conditions caused by fading of the wireless channel, the environment, obstructions appearing between the endpoint devices, and by movements of people or objects between or close to the two end-point devices.

SUMMARY

A method for dynamically adjusting transmit power of a first device that is in communication with a second device using a wireless communications protocol, includes, in part, determining, by the second device, a received signal strength indication (RSSI) associated with a signal received from the first device; determining, by the second device, a first amount of power adjustment for the first device in accordance with the determined RSSI; transmitting the first amount of power adjustment from the second device to the first device; determining, by the first device, a second amount of power adjustment for the first device in accordance with the RSSI and the first amount of power adjustment; and changing a transmit power of the first device in accordance with the second amount of power adjustment.

In one embodiment, the RSSI is filtered using an exponential moving average filtering function. In one embodiment, the method further includes, in part, transmitting the first amount of power adjustment from the second device to the first device via one or more messages defined by the wireless communications protocol.

In one embodiment, the method further includes, in part, defining a Gaussian distribution for the RSSI; and determining the first amount of power adjustment and the second amount of power adjustment further in accordance with a standard deviation of the Gaussian distributed RSSI. In one embodiment, the method further includes, in part, transmitting a message from the first device to the second device, wherein the message indicates the second amount of power adjustment.

In one embodiment, the method further includes, in part, determining, by the first device, a maximum decrease in transmit power of the first device that is acceptable to the first device; and transmitting to the second device the determined maximum decrease in transmit power of the first device.

In one embodiment, the method further includes, in part, determining, by the first device, a third amount of power adjustment for the second device in accordance with the maximum decrease in the transmit power of the first device; and transmitting the third amount of power adjustment from the first device to the second device. In one embodiment, the method further includes, in part, filtering the RSSI using an exponential moving average filtering function to generate a filtered RSSI; and setting the maximum decrease in transmit power of the first device to zero if the filtered RSSI is less than or equal to a predefined value.

In one embodiment, the method further includes, in part, varying a transmit power of the second device in accordance with the third amount of power adjustment and the changed transmit power of the first device. In one embodiment, the method further includes, in part, determining, by the first device, the second amount of power adjustment further in accordance with a variable fractional factor.

A wireless communication device that includes, in part, a communications controller, a memory, and a power control system, is configured to receive, from a peer wireless communication device (peer device), a first amount of power adjustment to be made to transmit power of the wireless communication device. The first amount of power is determined by the peer device in accordance with a received signal strength indication (RSSI) associated with a signal the peer device receives from the wireless communication device. The wireless communication device is further configured, in part, to determine a second amount of power adjustment for the wireless communication device in accordance with the RSSI and the first amount of power adjustment; and change the transmit power of the wireless communication device in accordance with the second amount of power adjustment.

In one embodiment, the RSSI is filtered using an exponential moving average filtering function. In one embodiment, the wireless communication device is further configured to receive the first amount of power adjustment from the peer device via one or more messages defined by a communications protocol in conformity with which the wireless communication device and the peer device communicate.

In one embodiment, the wireless communication device is further configured to define a Gaussian distribution for the RSSI; and determine the second amount of power adjustment further in accordance with a standard deviation of the Gaussian distributed RSSI. In one embodiment, the wireless communication device is further configured to transmit a message to the peer device indicating the second amount of power adjustment.

In one embodiment, the wireless communication device is further configured to determine a maximum decrease in transmit power of the wireless communication device that is acceptable to the peer device and communicated to the peer device; and transmit to the peer device the maximum acceptable decrease in transmit power of the peer device when transmitting to the wireless communication device.

In one embodiment, the wireless communication device is further configured to determine a third amount of power adjustment for the peer device in accordance with the maximum decrease in transmit power of the wireless communication device; and transmit the third amount of power adjustment to the peer device. In one embodiment, the wireless communication device is further configured to set the maximum decrease in the transmit power of the wireless communication device to zero if a filtered RSSI is less than or equal to a predefined value.

In one embodiment, the wireless communication device is further configured to cause a transmit power of the peer device to vary in accordance with the third amount of power adjustment and the changed transmit power of the wireless communication device. In one embodiment, the wireless communication device is further configured to determine the second amount of power adjustment further in accordance with a variable fractional factor.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

The Bluetooth low energy (BLE) 5.2 standard defines the message formats and message processing rules at the BLE end-point devices of a power control loop. However, the standard does not define how to use such information in adjusting the transmission (TX) power level. Generally, the channel between two end-points in a BLE connection fluctuates over time due to factors such as varying path losses caused by movement, varying channel conditions caused by fading of the wireless channel, the environment, obstructions appearing between the endpoint devices, and by movements of people or objects between or close to the two end-point devices. Power control plays an important role in such environments by tuning the TX power level according to the varying channel conditions.

Aspects of the present disclosure relate to methods and systems for control of the transmission power control in BLE controllers and devices. In one embodiment, control of the transmission power is carried out based on the link level power control framework defined in the BLE standard 5.2.

Figure 1:
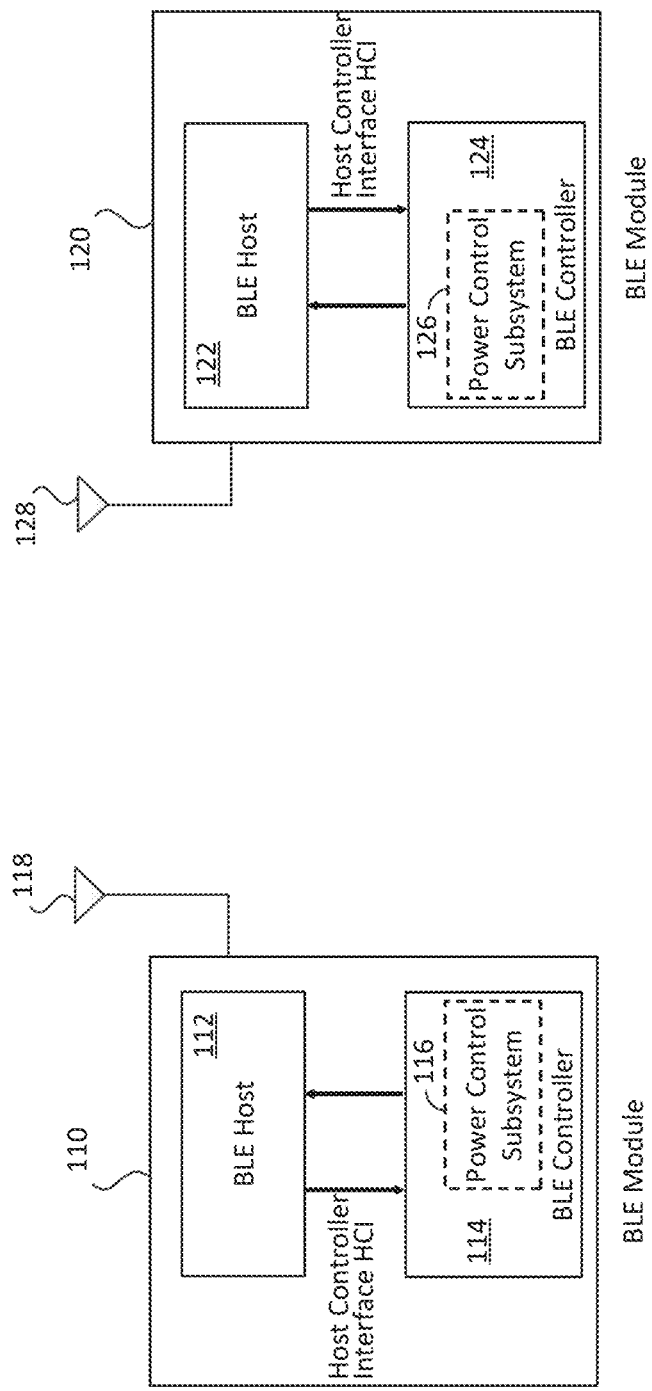
FIG. 1 shows a pair of BLE devices adapted to operate in accordance with embodiments of the present disclosure.

FIG. 1 shows a pair of BLE devices 110, 120 adapted to operate in accordance with embodiments of the present disclosure. BLE 110 is shown as including a BLE host 112, a BLE controller 116 having disposed therein a power control subsystem 114, and an antenna 118. BLE 120 is shown as including a BLE host 122, a BLE controller 126 having disposed therein a power control subsystem 124, and an antenna 128. BLE devices (also referred to herein as modules) 110 and 120 communicate with one another wirelessly via antennas 118 and 128.

A BLE device may be a central BLE device or a peripheral BLE device in any given connection. Herein, both a central BLE device and/or a peripheral BLE device are alternatively referred to as BLE nodes, BLE end-point or nodes. The transmission power control methods described herein apply to any BLE node.

Embodiments of the present disclosure provide a number of advantages. Among such advantages are control of the transmission power of a BLE controller to maintain the received signal strength indicator (RSSI) at a BLE node positioned within a specified range, minimal power usage to maintain the RSSI at the BLE node, avoidance of relatively low strength signals at a BLE node below a sensitivity level that would otherwise cause link outage, avoidance of relatively high signal level at a BLE node that would otherwise result in saturation in the receiver power amplifiers thus causing signal loss, maintenance of the signal to noise ratio at a BLE node at a suitable value thus achieving low bit error rate (BER) and enhanced link rate, enhanced life time due to foreseen power reduction (e.g., as many of the BLE devices are battery powered), use of the minimum power to maintain the link at a desired condition thereby reducing interference on other communication using the same band, enhancing co-existence with other low energy communications standards operating in the ISM band, and independent control of the power transmission in multiple directions, i.e., either of the two end points can control the transmission power of each other or only one direction of the power control loop is activated.

Embodiments of the present disclosure advantageously provide a number of power transmission control techniques each with different characteristics and tunable parameters which can be adjusted according to the desired performance objectives. In one embodiment, a defined interface between a BLE host and a BLE controller selects one of the power transmission control techniques, selects the parameters of the technique, selects the frequency of the power control update, and activates/deactivates power control in a specific direction.

Embodiments of the present disclosure provide configurability. For example the selected parameters may be changed during run-time and under the direction of the BLE host of either connection nodes. The frequency of the transmit power control message exchange may also be changed.

In one embodiment, a filtering mechanism for the RSSI readings is used to control the power based on an estimate of the RSSI and not the instantaneous value of the RSSI which typically varies abruptly due to multipath effects, particularly for indoor environments. The filtering mechanism has configurable parameters.

In one embodiment, power transmission control is carried out based on local information and the feedback from the peer BLE node as well as a prediction of the RSSI at the local BLE node. In one embodiment, a distributed closed loop power control mechanism may be started independently by a BLE node either autonomously by a BLE controller or under the direction of a BLE host. Embodiments of the present disclosure are relatively simple to implement and are suitable for embedded devices such as BLE controllers. Embodiments of the present disclosure use the RSSI readings and the messages defined by the standard. Any other information that may be needed for transmission power control may be easily communicated by the BLE nodes participating in the power control procedure at the start of the power control procedure. Moreover, if the two BLE devices are in relatively close proximity of one other, both devices can continue to operate in a desired range most of the time.

Embodiments of the present disclosure provide a number of methods and systems for controlling transmit (TX) power at the end-points of a BLE communication link. The communications link operates at a pre-defined RSSI range (referred to herein as golden range) while using the least possible transmission power. When the RSSI is maintained within a golden range, the receiver continues to receive a high quality signal thus resulting in low error rates. Therefore, an enhanced throughput and a lower power consumption is achieved. Power control also enables BLE devices to adjust transmission power to the least required level for proper operation thus improving coexistence within the 2.4 GHz frequency band.

A transmit power control technique, in accordance with embodiments of the present disclosure may be carried out by power control subsystems 116 and 126 disposed within BLE controllers 114 and 124 of FIG. 1. The power control subsystems use the BLE standard power control messages and the relative signal strength indicator (RSSI) readings that are available with the majority of BLE receivers/transmitters (i.e., transceivers). The power control subsystems may operate autonomously within their respective BLE controllers or may operate in concert with a BLE host. The BLE standard also defines host-controller messages and events related to the power transmission control. In one example, the BLE host selects the power control method, sets its parameters, and the frequency of the application of power control. Alternatively, the BLE controller may be hard-wired to perform the methods described herein at build time.

Embodiments of the present disclosure enable the transmit (TX) power level for a BLE receiving device to be dynamically controlled. In one embodiment, this is achieved by enabling a BLE receiver device that monitors the RSSI level of the received transmissions from a peer BLE transmitting device to request an adjustment of the power transmitted by the peer BLE transmitting device. A BLE transmitting device may also adjust its own transmit power autonomously and inform a peer BLE receiving device of the new transmit power level along with other parameters defined in the BLE power control messages, as described further below.

Link Layer Messages

A BLE Link layer defines three types of messages for power control, namely LL_POWER_CONTROL_REQ, LL_POWER_CONTROL_RSP and LL_POWER_CHANGE_IND.

LL_POWER_CONTROL_REQ

The LL_POWER_CONTROL_REQ message is used by one end-point of the communications link to request its transmitting peer to adjust its power level, and to report its own transmission power. The message includes three fields, namely PHY, Delta (also referred to herein as delta) and TXPower. The PHY field is used to indicate the BLE physical layer to which the command is applied. The Delta field is a signed integer value expressed in dB that indicates the requested adjustment in the peer TX power. A value of 127 indicates a maximum increase in TXpower. The TXPower field is a signed integer defining a node's TX power in dBm. A value of 127 indicates that the field TXPower is not submitted by the node sending the message.

LL_POWER_CONTROL_RSP

The LL_POWER_CONTROL_RSP message is used as a response to the LL_POWER_CONTROL_REQ message. The message includes, in part, the two fields Delta and TXPower as defined in the LL_POWER_CONTROL_REQ message. The message also include the fields Min, Max, and APR. The Min field is a 1-bit flag that indicates whether a node is currently using the minimum TX power. The Max field is a 1-bit flag that indicates whether a node is currently using the maximum TX power. The field APR indicates the maximum decrease a peer transmitting device may apply to its transmission power level in dB and which is acceptable to the peer device requesting the change in the power transmission level. The APR field is also alternatively referred to herein as $APR_{peer}$.

LL_POWER_CHANGE_IND

The LL_POWER_CHANGE_IND field is used to notify a peer node of a change in the TX power performed autonomously by a transmitting node (e.g., without the peer node sending a LL_POWER_CONTROL_REQ message). Embodiments of the present disclosure control the TX power of a BLE node using messages LL_POWER_CTRL_REQ and LL_POWER_CTRL_RSP. Processing of a LL_POWER_CHANGE_IND message may be performed in a similar manner without including the effect of the APR. Embodiments of the present disclosure may be applied over both directions of a communication link or over one direction independently. The following description may, in parts, be provided with reference to only one direction of a communications link to illustrate the concepts. However, it is understood that embodiments of the present disclosure equally apply to bi-directional power control, as the two directions of a link are independent from one another.

Figure 2:
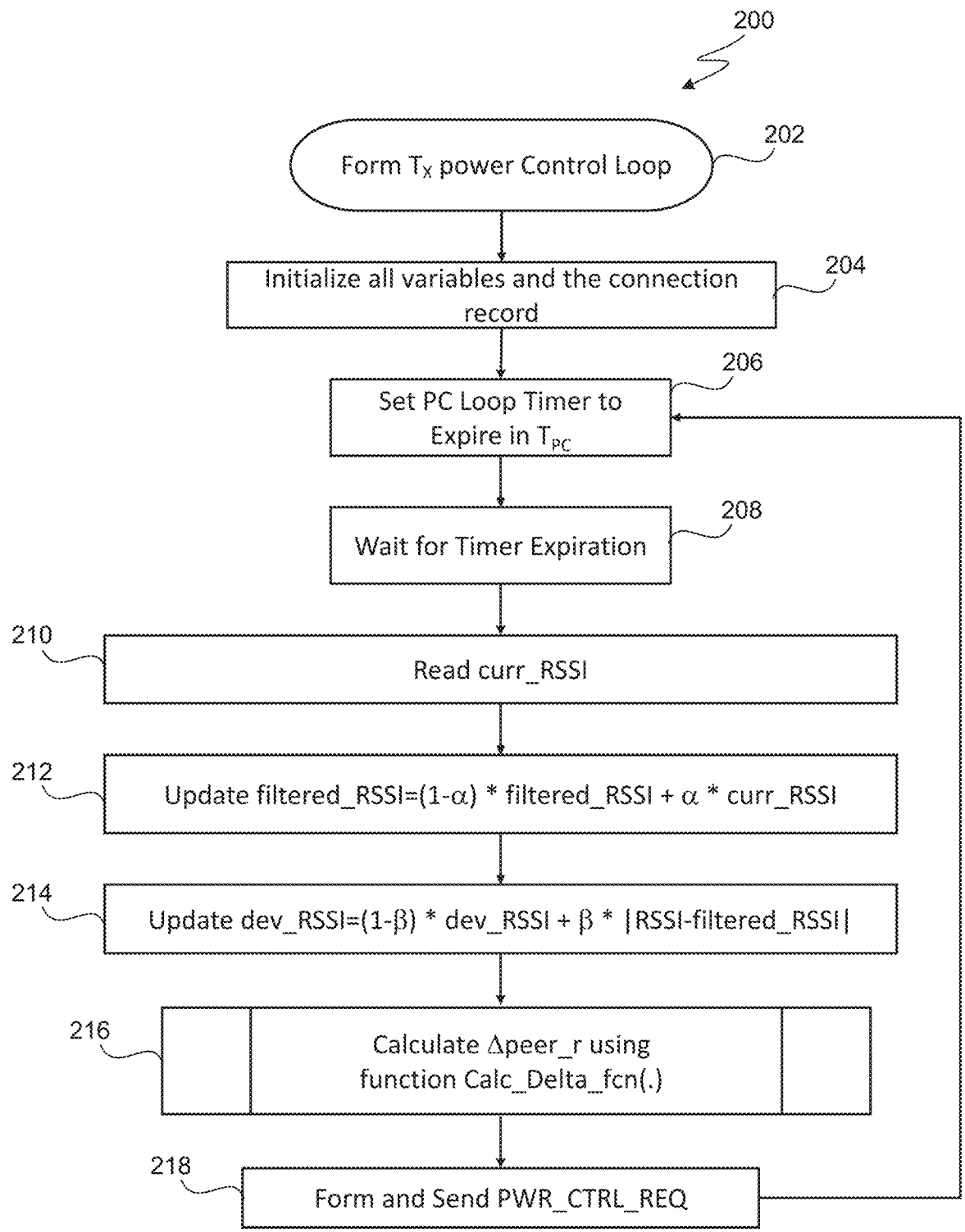
FIG. 2 is an example of a flow for adjusting the transmit power of a BLE node, in accordance with one embodiment of the present disclosure.

FIG. 2 is an example of a data flow 200 for adjusting the transmission power of a transmitting BLE node as requested by a receiving BLE node after a connection between the two nodes has been established. At 202, a transmit power control loop is formed between a BLE receiver and a BLE transmitter to control the transmission power of the BLE transmitter. At 204, the connection variables are initialized and stored in a connection record. The connection record stores data such as the period of the connection, the number of packets that have been forwarded, received, and the like. At 206, the power control (pc) loop timer is set to expire in $T_{PC}$ seconds. The timer fires periodically. Upon each such firing, the actions described further below at 210-216 are performed. At 208, the power control waits for the timer expiration. The control loop also identifies the selected power control method and retrieves the selected parameters which are supplied by the host or hard-configured in the controller of either the transmitter or receiver participating in the communications.

At 210, the instantaneous value of RSSI, represented by parameter curr_RSSI, is retrieved. Parameter curr_RSSI is then filtered, using any one of a number of filtering techniques such as an exponential moving average technique, to generate parameter filtered_RSSI. At 212, parameter filtered_RSSI is updated to generate parameter Updated filtered_RSSI according to the following expression:

$$\text{Updated filtered\_RSSI} = (1-\alpha)*\text{filtered\_RSSI} + \alpha*\text{curr\_RSSI}$$

where $\alpha$ is a variable of an exponential moving average filter (not shown) for updating the parameter filtered_RSSI.

Next, parameter dev_RSSI, which represents an estimated standard deviation of the RSSI is determined as shown below:

$$\text{dev\_RSSI} = |\text{RSSI} - \text{filtered\_RSSI}|$$

As described further below, parameter dev_RSSI is estimated by assuming a Gaussian distribution for the RSSI. Then, at 214, parameter dev_RSSI is updated to generate parameter Updated dev_RSSI according to the following expression:

$$\text{Updated dev\_RSSI} = (1-\beta)*\text{dev\_RSSI} + \beta*|\text{RSSI} - \text{filtered\_RSSI}|$$

where $\beta$ is a variable of the exponential moving average filter (not shown) for updating the parameter dev_RSSI.

At 216, the transmission power adjustment parameter $\Delta_{peer\_r}$, as requested by a receiving BLE endpoint, is computed using the function Calc_Delta_fcn(.). This function may be an aggressive function, as described below with reference to FIG. 9, a smooth function as described below with reference to FIG. 10, or a step function, as described below with reference to FIG. 11. The computed $\Delta_{peer\_r}$ is thereafter disposed in a power control request message PWR_CTRL_REQ message at 218 and forwarded to the peer BLE node to adjust its transmission power. The process flow 200 is terminated either autonomously by the BLE controller or under direction of the BLE host by deactivating the timer (see FIG. 1).

As is described above, the updated values of the filtered_RSSI and dev_RSSI are computed using an exponential moving average (EMA) filter. The filtered_RSSI and dev_RSSI values are then used in subsequent calculations for the power control adjustments. One advantage of using an exponential moving average filter is its relative ease of calculation. Moreover, if the values of the parameters $\alpha$ or $\beta$ are suitably selected, the computation can be performed relatively fast. For example, if $\alpha=\frac{1}{4}$, no division is performed. Shift right register operations may be performed on the integer valued curr_RSSI and filtered_RSSI to perform divisions.

The use of filtered values leads to smooth and less frequent changes in the transmit power level that are more affected by long-term communications channel behavior and not by instantaneous changes. Since the controller is required to report the transmit power level changes to the hosts, embodiments of the present disclosure reduce the number of events generated on the host controller interface (HCI).

Parameter RSSI exhibits a relatively high variation, particularly in indoor environments in the ISM band (see, e.g., FIGS. 12A and 12B for sample RSSI values). Moreover, there is a strong correlation between the transmit power and the RSSI if bi-directional power control is applied, particularly when the two directions of the link are symmetric, as described further below.

In an EMA filter, all previous samples of the RSSI contribute to the new estimate with an exponentially decaying contribution. Thus, each sample has the full history but is more biased towards newer values.

When a BLE node sends a request to its peer to increase its transmit power (TX), the RSSI is enhanced if the channel conditions have not changed substantially within the time period between the issuance of the request/receipt of the packets and the increased power. Thus, if the two directions of the link are statistically similar, a strong correlation is expected to exist between the TX power at a node and the RSSI.

Figure 3:
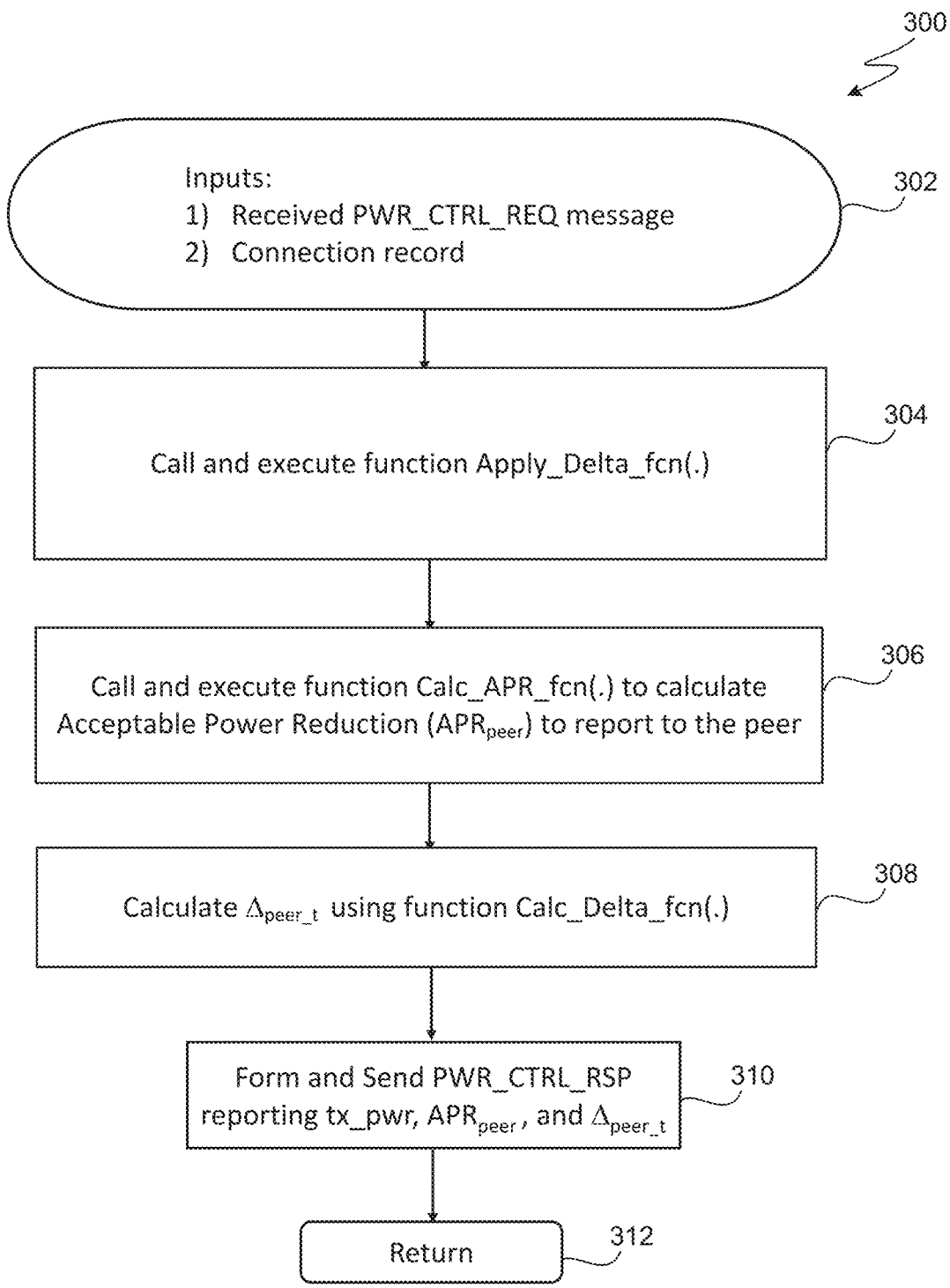
FIG. 3 is an example of a flow for adjusting the transmit power of a BLE node, in accordance with one embodiment of the present disclosure.

FIG. 3 is an example of a data flow 300 for adjusting the transmit power of a transmitting BLE node as performed by the BLE transmitting node in response to a PWR_CTRL_REQ message received from a peer node requesting the power adjustment as described above with respect to FIG. 2. At 302, a PWR_CTRL_REQ message and the data stored in the connection record are received. At 304, a function referred to herein as Apply_Delta_fcn(.), adapted to determine a new transmit power for the transmitting node as described further below, is invoked. At 306, a function referred to herein as Calc_APR_fcn(.) is invoked to compute the amount of power reduction ($APR_{peer}$) that is acceptable to the receiving node and reported to the peer node in a PWR_CTRL_RSP message. At 308, the adjustment in the transmitting peer's transmit power in dB, represented by parameter $\Delta_{peer\_r}$, is computed using the function Calc_Delta_fcn(.). At 310, a response message, referred to herein as PWR_CTRL_RSP, that includes the newly calculated transmit power of the transmitting node, the $APR_{peer}$ and $\Delta_{peer\_t}$ is formed. At 312, the PWR_CTRL_RSP message is returned to the BLE peer node requesting the change in the transmit power.

Figure 4:
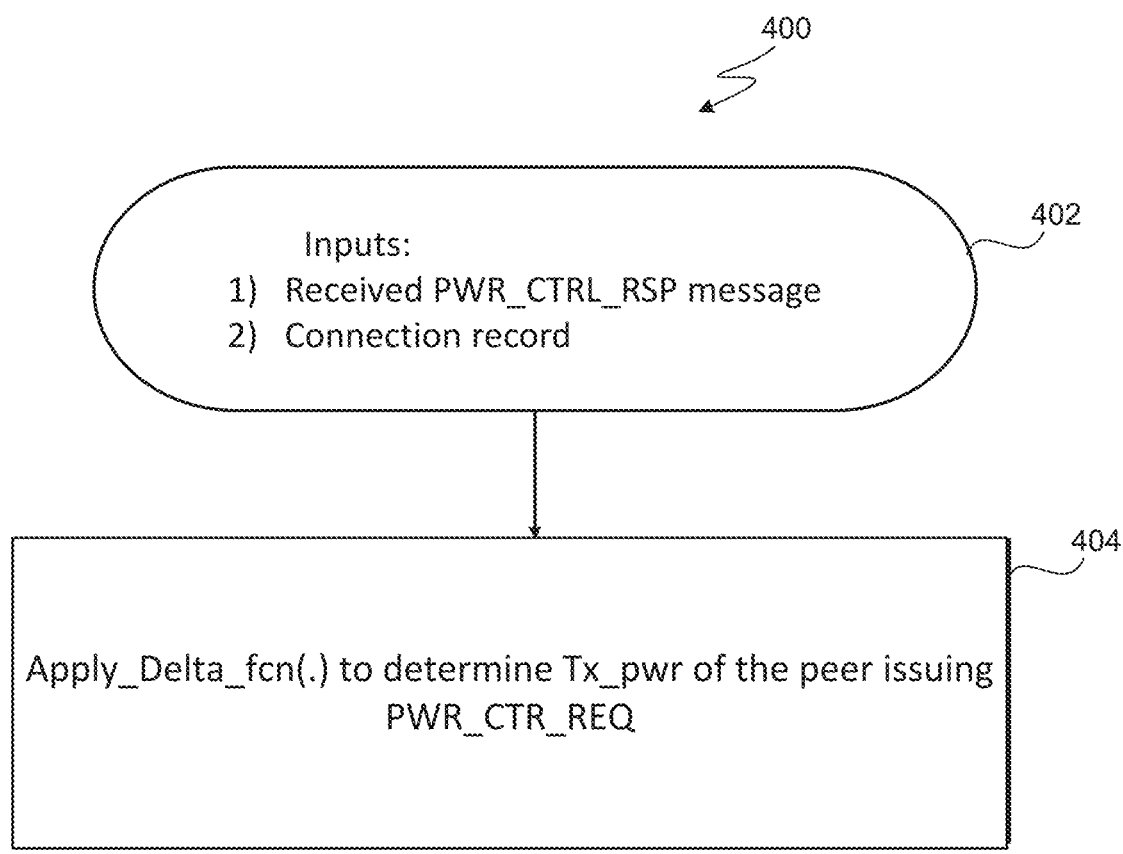
FIG. 4 is an example of a flow for adjusting the transmit power of a BLE node, in accordance with one embodiment of the present disclosure.

FIG. 4 is an example of a data flow 400 for adjusting the transmit power of a BLE node submitting a PWR_CTRL_REQ to its transmitting peer node, in response to which the transmitting peer node also requests that the BLE node submitting the PWR_CTRL_REQ to adjust its transmit power via a PWR_CTRL_RSP message. In response to the receipt of a PWR_CTRL_RSP message and the connection record at 402, the function Apply_Delta_fcn(.) is executed at 404 to adjust the transmit power of the BLE node that submitted the PWR_CTRL_REQ. In making this power adjustment, the Apply_Delta_fcn(.) uses the $\Delta_{peer\_t}$, the newly determined transmit power (tx_pwr) of the peer BLE transmitting node, and the parameter $APR_{peer}$.

Figure 5A:
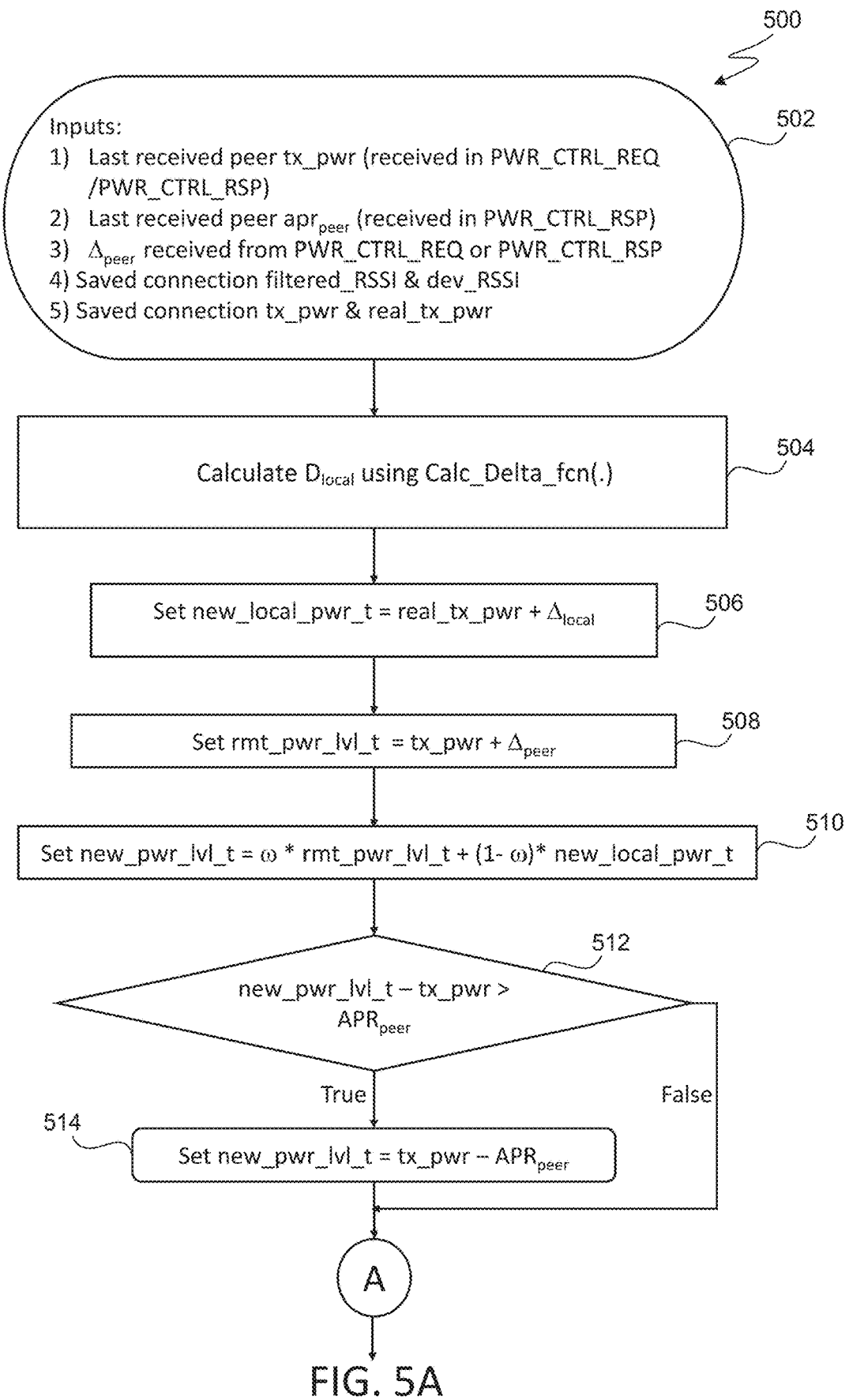
FIGS. 5A and 5B together provide more details of a flow for adjusting the transmit power of a BLE node, in accordance with one embodiment of the present disclosure.
Figure 5B:
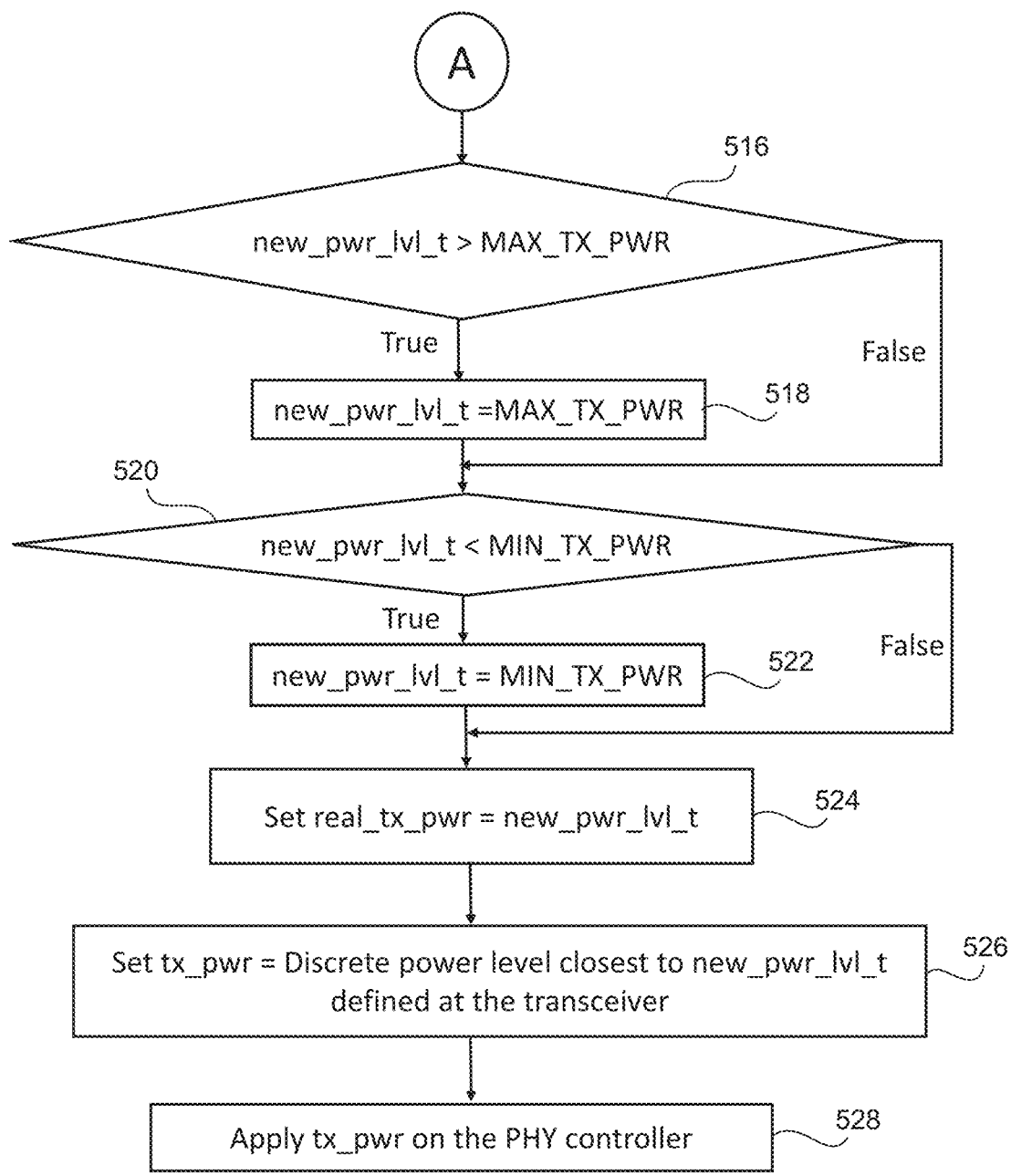

FIGS. 5A and 5B together show the flow for executing the function Apply_Delta_fcn(.) described above. A BLE node participating in the power control procedure has information about its own transmit power and receives its peer transmit power via PWR_CTRL_REQ or PWR_CTRL_RSP messages. A BLE node can then use both its own transmit power as well as that of its peer in determining the BLE node's next transmit power level.

The Apply_Delta_fcn(.) function maintains two values of transmit power variable in the connection records, namely real_tx_pwr, and tx_pwr. The real_tx_pwr variable represents the transmit power calculated using a previous invocation of Apply_Delta_fcn(.) (also referred to herein as procedure) and is approximated to the nearest discrete TX power level supported by the transceiver.

Each transceiver implements only a set of discrete power levels. Each time a change is made to the transmit power, variable real_tx_pwr is approximated to the closest discrete power level higher than or equal to its value. The approximated real_tx_pwr is then maintained as the variable tx_pwr in the connection record. The tx_pwr is the value applied at the PHY layer over which power control is exercised.

At 502, the following information are received: (1) the last tx_pwr received from a peer using PWR_CTL_REQ or PWR_CTL_RSP messages, (2) the last $APR_{peer}$ received in PWR_CTL_RSP message, (3) $\Delta_{peer}$ received via a PWR_CTL_REQ or PWR_CTL_RSP messages, and (4) parameters filtered_RSSI, dev_RSSI, tx_pwr and real_tx_pwr as saved in the connection record.

At 504, parameter $\Delta_{local}$, which represents the local power control adjustment in a node's own transmit power in dB, is computed using the function Calc_delta_fcn(.). In making this computation, information about tx_pwr of a peer as received in the PWR_CTRL_REQ/RSP messages is also used.

At 506, a parameter referred to herein as new_local_pwr_t is determined as shown below:

new_local_pwr_$t$=tx_pwr+$\Delta_{local}$

At 508, a parameter referred to herein as rmt_pwr_lvl_t is determined as shown below:

rmt_pwr_lvl_$t$=tx_pwr+$\Delta_{peer}$

At 510, a parameter referred to herein as new_pwr_lvl_t is determined as shown below:

new_pwr_lvl_$t$=ω*rmt_pwr_lvl_$t$+(1−ω)*new_local_pwr_$t$ where ω is a variable used in the calculation of tx_pwr based on $\Delta_{peer}$ and $\Delta_{local}$.

If at 512, the difference between new_pwr_lvl_t and current TX power (tx_pwr) is determined to be greater than parameter $APR_{peer}$, then at 514, parameter new_pwr_lvl_t is updated as shown below:

new_pwr_lvl_$t$=tx$_{pwr}$−$APR_{peer}$

If at 512, new_pwr_lvl_t is determined to be less than or equal to parameter $APR_{peer}$, then at 516, a determination is made as to whether parameter new_pwr_lvl_t is greater than parameter MAX_TX_PWR, which is the maximum value of the transmit power of the transceiver in dBm.

If at 516 it is determined that new_pwr_lvl_t is greater than MAX_TX_PWR (the maximum allowable transmission power), then at 518 new_pwr_lvl_t is set to MAX_TX_PWR as shown below:

new_pwr_lvl_$t$=MAX_TX_PWR

Thereafter at 520, a determination is made as to whether parameter new_pwr_lvl_t is less than parameter Min_TX_PWR, which is the minimum value of the transmit power of the transceiver in dBm. If at 516 it is determined that new_pwr_lvl_t is not greater than MAX_TX_PWR, then the flow transitions from 516 to 520, where as described above, a determination is made as to whether parameter new_pwr_lvl_t is less than parameter Min_TX_PWR.

If at 520 it is determined that new_pwr_lvl_t is smaller than MIN_TX_PWR, then at 522 new_pwr_lvl_t is set to MIN_TX_PWR as shown below:

new_pwr_lvl_$t$=MIN_TX_PWR

Thereafter at 524 parameter real_tx_pwr is set to new_pwr_lvl_t as shown below:

real_tx_pwr=new_pwr_lvl_$t$

If at 520 it is determined that new_pwr_lvl_t is not smaller than MIN_TX_PWR, then the flow transitions to 524 where parameter real_tx_pwr is set to new_pwr_lvl_t as described above.

At 526, the power level defined by real_tx_pwr is discretized to generate the transmit power tx_pwr in dBm. At 528 the PHY layer controller of the transmitter receives the tx_pwr.

Figure 6:
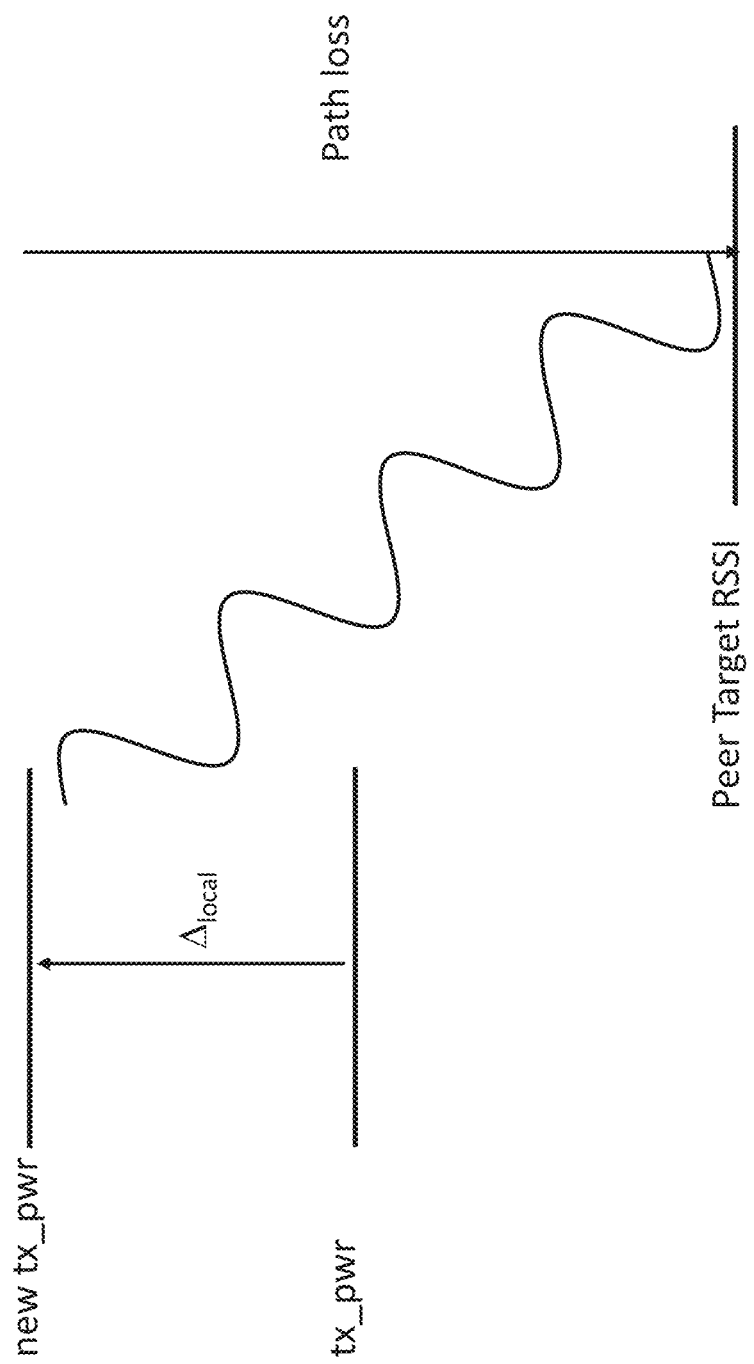
FIG. 6 shows the change in the transmit power of a local node, in accordance with one embodiment of the present disclosure.

FIG. 6 shows an example of $\Delta_{local}$, which as shown above, is the difference between new_local_pwr_t and tx_pwr. In addition to the requested change in the transmission power requested from a peer, the peer may also report its own transmit power in the PWR_CTRL_REQ/RSP messages. This information may be used to estimate the path loss between the two peers. The difference between a peer's transmit power and the desired level of RSSI (target RSSI) at a receiving peer provides an estimate of the path loss in the direction from the transmitting peer to the receiving peer.

A peer delta $\Delta_{peer}$—which is the difference in the transmit power—is a delta value calculated by a first peer and recommended to a second peer as the amount of the power adjustment to be applied by the second peer. A local delta $\Delta_{local}$ is a delta in the transmit power calculated locally by a first peer for the adjustment of the first peer's own power based on the first peer's current TX power and the data received by the first peer from a second peer. Accordingly, given that a first peer (e.g., a local node) knows the target RSSI at a second peer, the adjustment to the first peer's own transmit power may be determined such that when the adjustment is applied to subsequent transmissions, and factoring in the expected path loss and symmetry of the link, the second peer receiving the transmission (i.e., the receiver) may operate at an RSSI range that is substantially close to the target RSSI. In one embodiment, the second peer communicates its target RSSI to the first peer node via a channel. In another embodiment, the first peer assumes that the target RSSI of the second peer is equal to the target RSSI of the first peer.

Embodiments of the present disclosure provide an estimate of an upper bound of the path loss as described below. Using the filtered values of the RSSI (filtered_RSSI) and standard deviation of the RSSI (dev_RSSI), which are periodically updated in the aforementioned data flow 200, a lower bound of the RSSI that may be experienced at the local receiver may be estimated. This estimate together with the reported peer transmit power may be used to calculate an estimate of the upper bound of the path loss. It is assumed that the filtered RSSI values follow a Gaussian distribution.

Figure 7:
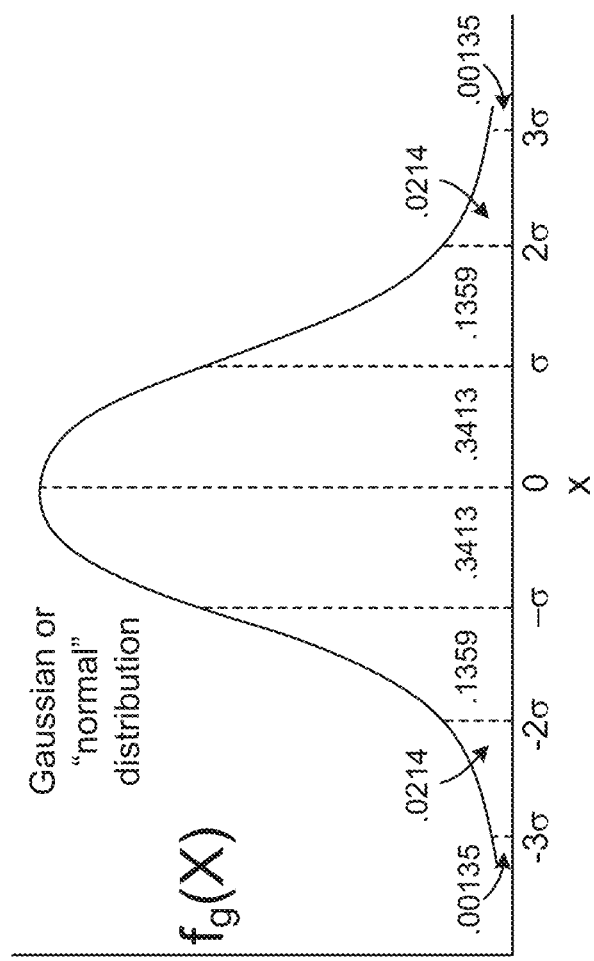
FIG. 7 is an example of a Gaussian distribution of an RSSI for use with embodiments of the present disclosure.

FIG. 7 is an example of a Gaussian distribution of a random variable, such as RSSI, for use with embodiments of the present disclosure. Since the estimate of the RSSI deviation is known, the value (filtered_RSSI−GF*dev_RSSI) may be used as an estimate of the lower bound of the RSSI at a local node, where GF represents a configurable Gaussian factor or parameter. For example, if GF has a value of 3, only 0.005% of RSSI samples can statistically be lower than the estimate.

In one embodiment, each of the power transmission control flows described herein uses its own value for the GF. For example, different values of GF may be used for the three Calc_delta_fcn(.) functions described herein, namely the aggressive function, the smooth function, and the step function, described further below.

Referring to FIG. 6, the difference between a peer's tx_pwr and the estimated path loss defines a lower bound of an estimate of the RSSI (tx_pwr−the estimated path loss=estimate of the RSSI lower bound). Therefore, the estimated path loss=(peer's tx_pwr−estimate of the RSSI lower bound). The estimated path loss is therefore a reasonable estimate of a current upper bound of the path loss. Using this path loss estimate, if the local tx_pwr is increased by $\Delta_{local}$, and assuming the same path loss level will be experienced in the reverse direction, the following expression may be used:

real_tx_pwr+$\Delta_{local}$−estimated path loss=peer target RSSI

The above expression may be written as:

$\Delta_{local}$=peer target RSSI−real_tx_pwr+estimated Path Loss, or $\Delta_{local}$=peer target RSSI−real_tx_pwr+(peer tx_pwr−estimate of RSSI lower bound)

In one embodiment, the calculations herein may be performed with power values in dBm. However, the resulting $\Delta_{local}$ is obtained in dB as defined in the BLE standard. This is because when applied to power values expressed in dBm, multiplication/division is converted to addition/subtraction respectively and the value of $\Delta_{local}$ in dB is applied directly to powers expressed in dBm via addition/subtraction, as demonstrated further below:

$\Delta_{local}$=10 log(new power in mwatts/old power in mwatts)

$\Delta_{local}$=10 log new power−10 log old power $\Delta_{local}$=new power in dBm−old power in dBm Both $\Delta_{local}$ and $\Delta_{peer}$ may then be used to provide an adjustment to the TX power, as described further below.

Calculation of Final TX Power

In some embodiments, a new transmit power may be determined as shown below:

real_tx_pwr=ω*(real_tx_pwr+$\Delta_{local}$)+(1−ω)*(tx_pwr+$\Delta_{peer}$).

Parameter $\Delta_{peer}$ is used to adjust parameter tx_pwr which represents the last transmit power value used for transmission to a peer. Parameter real_tx_pwr represents the best power transmission level estimate to maintain a target RSSI at a peer. However, due to the fact that most transceivers allow for only a limited number of discrete transmit power levels, real_tx_pwr may be changed to the closest allowable transmit power level (e.g., which is held in the variable tx_pwr). Such a choice does not affect the performance when adjusting tx_pwr using $\Delta_{local}$ and $\Delta_{peer}$. The value of variable ω is a configurable parameter. In one embodiment, ω may be set to a suitable value of 0.5 when the channels in the two directions are statistically similar.

The difference between a previous value of tx_pwr and a new value of tx_pwr is evaluated to determine whether it is greater than $APR_{peer}$. If this difference is determined to be greater than $APR_{peer}$, then the transmit power reduction is limited to the value of $APR_{peer}$, as shown below:

real_tx_pwr=tx_pwr−$APR_{peer}$

Next, the transmit power is evaluated to determine whether it is higher than the maximum transmit power or lower than the minimum transmit power level allowed by the transceiver, and if so determined, set either to the maximum or the minimum level accordingly. If transmit power is evaluated to be between the maximum and the minimum allowable limits, then the real_tx_pwr is set to the closest power level allowed by the transceiver. The transceiver circuitry is then programmed to transmit at the new power level.

Figure 8:
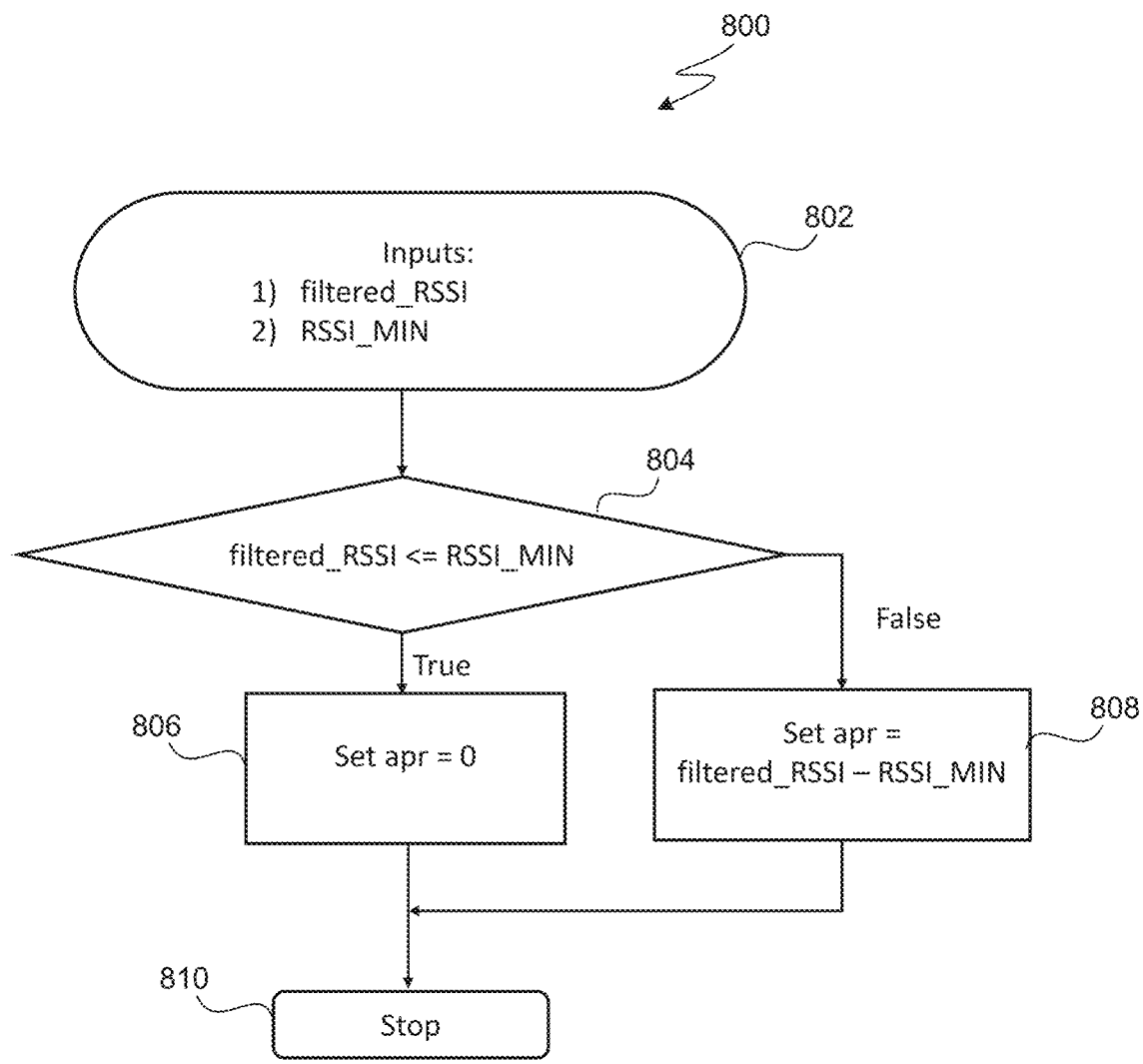
FIG. 8 shows a flow for determining an acceptable level of reduction in power of a BLE node, in accordance with embodiments of the present disclosure.

FIG. 8 shows the process 800 for determining the value of the function Calc_APR_fcn(.) representing the acceptable power reduction (APR) level, in accordance with embodiments of the present disclosure. The input parameters to this function are filtered_RSSI and RSSI_MIN, as shown at 802. AT 804, the BLE node executing the function checks to determine if filtered_RSSI is less than or equal to RSSI_MIN which is the minimum value of RSSI (due to receiver sensitivity) for acceptable performance. If at 804, filtered_RSSI is determined to be less than or equal to RSSI_MIN, then at 806, APR is set to zero, thus indicating that the node cannot reduce its power level. If at 804, filtered_RSSI is determined to be greater than RSSI_MIN, then at 808, APR is set to a value defined by the difference between filtered_RSSI and RSSI_MIN. The calculation of the function ends at 810.

Due to the relatively high variability in instantons values of RSSI in indoor environments, process 800 may use a value slightly above the minimum level of RSSI to protect against frequent outages. For example, RSSI_GOLD_MIN, which is a variable for the minimum RSSI in the RSSI golden range, or a value that is between RSSI_GOLD_MIN and RSSI_MIN (i.e., the minimum value of RSSI required for proper reception of the transmitted signal) may be used. The golden range is defined as the range of RSSI values at which a BLE receiver operates optimally.

Calculation of Delta

Embodiments of the present disclosure provide a multitude of solutions for the calculation of the function Calc_Delta_fcn(.) to determine $\Delta_{peer}$ and $\Delta_{local}$. This includes the adjustment of the transmit power that a node recommends to its peer such that the link is maintained at a desired quality. Each solution has its own merits and performance advantages, as described further below.

As described above with respect to FIGS. 5A and 5B, a node calculates a value for the peer delta ($\Delta_{peer}$) and sends it in the PWR_CTRL_REQ or reports it in the PWR_C-TRL_RSP. Moreover, a node receiving a PWR_CTRL_REQ RSP from its peer calculates a local delta ($\Delta_{local}$) that it further uses in addition to $\Delta_{peer}$ to calculate a more refined estimate of its own power adjustment. The procedure for calculation of the peer and local deltas, namely $\Delta_{peer}$ and $\Delta_{local}$ vary slightly as described further below.

Calc_Delta_fcn(.)—Aggressive

To compute the delta power adjustment using an aggressive method in accordance with a first embodiment, a worst case RSSI lower bound estimate is assumed. Parameters filtered_RSSI and dev_RSSI are also used as input in this computation. It is assumed that RSSI has a Gaussian distribution and is regularly updated. The difference between a target RSSI and the worst case RSSI estimate is used as the amount of change in the local or peer transmit power.

Figure 9:
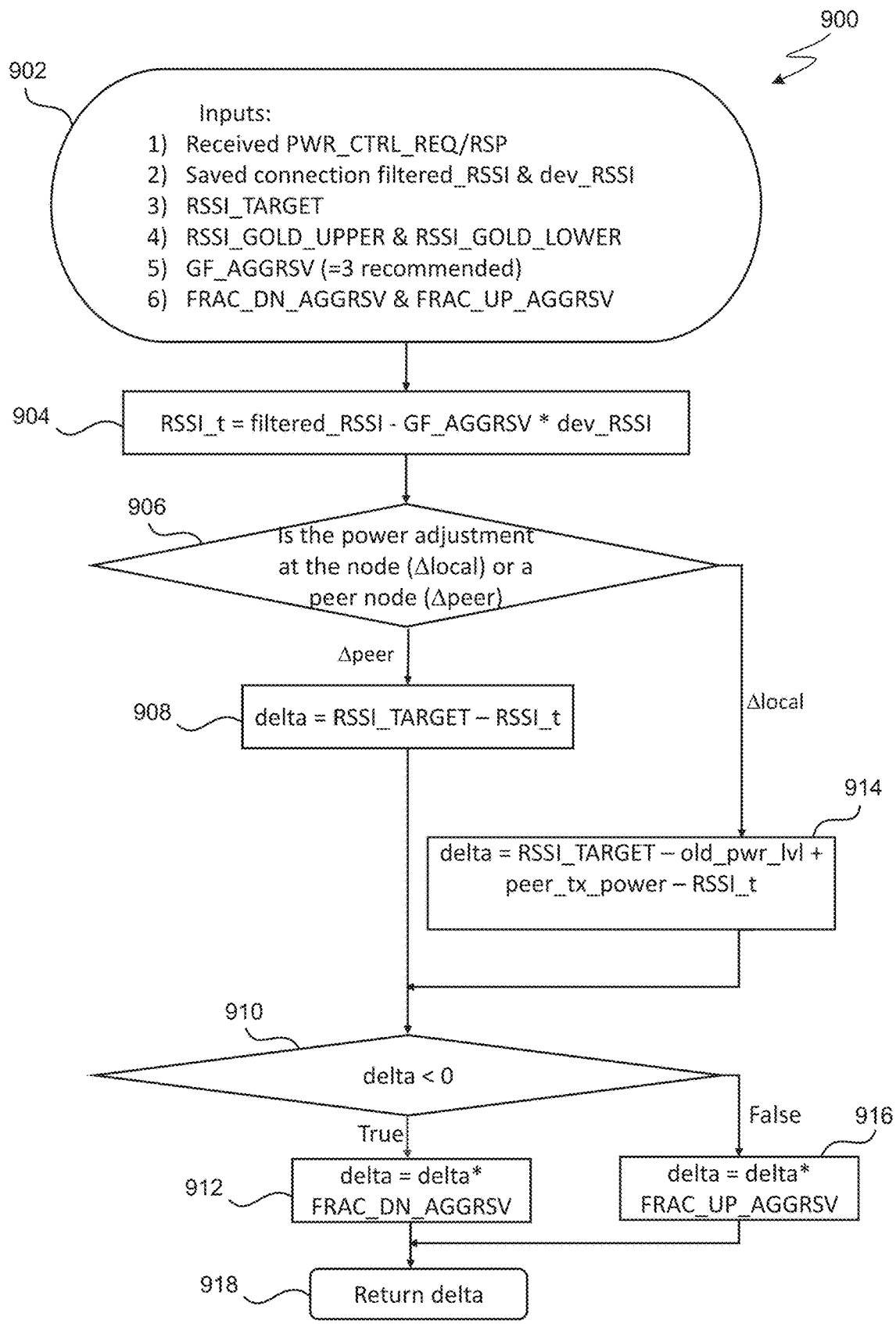
FIG. 9 show a flow associated with determining a change in the transmit power of a BLE node, in accordance with one embodiment of the present disclosure.

FIG. 9 is an example of the delta power adjustment 900 using an aggressive Calc_Delat_fcn(.), referred to herein as Calc_Delat_fcn(.) Aggrsv or Aggressive delta function, in accordance with a first embodiment of the present disclosure. The Aggrsv function is well adapted to rapidly changing link dynamics and tends to result in a relatively high variability of RSSI due to the rapid changes in power.

At 902, the input parameters to the function are received. The parameters include, in part, filtered_RSSI and dev_RSSI that are saved in the connection record, RSSI_Target which is the target RSSI after the power adjustment, RSSI_Gold_Upper which is a tunable variable for the maximum RSSI in the golden range RSSI_Gold_Lower which is a tunable variable for the minimum RSSI in the golden range, GF_Aggrsv which is a tunable Gaussian factor for the estimation of RSSI, Frac_Dn_Aggrsv which is a tunable fraction factor for decreasing the power adjustment, and Frac_Up_Aggrsv which is a tunable fraction factor for increasing the power adjustment.

At 904, parameter RSSI_t is determined using the following expression:

RSSI_$t$=filtered_RSSI−GF_Aggrsv*dev_RSSI

Parameters filtered_RSSI and dev_RSSI are respectively the mean and standard deviation of the RSSI, as described above. Thereafter, if at 906 it is determined that the power adjustment is to be made at the local node itself ($\Delta_{local}$), then at 914 the power adjustment value (alternatively referred to herein as "delta" as is also shown in FIG. 9) is determined as below:

delta=RSSI_target−old_pwr_lvl+peer_tx_power−RSSI_$t$ where old_pwr_lvl represents the previous transmission power of the local node and peer_tx_power represents the current transmission power of the peer node.

Subsequently, if at 910 delta is determined to be less than 0 dBm, then at 912, delta is adjusted by the following expression:

delta=delta*Frac_Dn_Agrrsv where Frac_Dn_Agrrsv is a tunable fractional power for downward adjustment of the power level.

If at 910 delta is determined not to be less than 0 dBm, then at 916, delta is adjusted by the following expression:

delta=delta*Frac_Up_Agrrsv where Frac_Up_Agrrsv is a tunable fractional power for upnward adjustment of the power level.

If at 906 it is determined that the power adjustment is to be made at a peer node ($\Delta_{peer}$), then at 908 delta is adjusted as shown below:

delta=RSSI_target−RSSI_$t$

The power adjustment flow then continues at 910 as described above. The calculated delta is the returned at 918 to using a message.

The parameter GF AGGRSV (which may be set, e.g., to 3 in one embodiment) is used to determine how pessimistic the estimate is. However, if the RSSI values are not highly variable, dev_RSSI will be small and the values will converge toward filtered_RSSI. On the other hand, if the RSSI values are highly variable, then dev_RSSI will be large and the estimate could be further away from filtered_RSSI.

Parameters Frac_Up_Agrrsv and Frac_Dn_Agrrsv achieve fractional power control by multiplying the calculated value of delta by a fraction of 1 to reduce the variability in the resulting link quality. Without fractional adjustment, the observed RSSI may become bursty thus causing the transmit power to vary relatively quickly.

As described above, a strong correlation exits between the transmit power and the observed RSSI. Therefore, due to fast fading, a channel may either provide additional gain for a node increasing its transmit power. Therefore, the RSSI at a peer node may be higher than required. Alternatively, due to a deep channel fade or other conditions, the delta adjustment may not be able to achieve the required RSSI level. The same conditions apply when a node attempts to decrease its own output power. By using fractional adjustment of the power, embodiments of the present disclosure reduce abrupt changes and enable the channel changes to occur smoothly.

In some embodiments, the calculation of delta is performed using Calc_Delta_Smooth_fcn(.), which is alternatively referred to herein as a smooth delta function. The smooth delta function is a modification of the Calc_Delta_Aggrsv_fcn(.) and reduces the variance in the transmit power. In such embodiments, a determination is made as to whether the estimate of the RSSI is within a suitable range of the RSSI target or a subset of the golden RSSI range. A parameter A, which defines a range above and below the target RSSI within which range no action is taken to adjust the power level in the smooth delta function and step delta function (described below), is used. The estimate of RSSI is then checked to determine whether it is within a target RSSI+2. If so determined, no change is made to delta (i.e., delta=0). The flow then continues in a manner similar to that described with respect to FIG. 9 but with different parameters set namely the GF_SMTH, FRAC_UP_SMTH and FRAC_DN_SMTH. The smooth function results in a lower variance of the transmit power but it is generally slower than Calc_Delta_Aggrsv_fcn(.) in locking to new long-term changes in the channel response. It also results in using higher average TX power than the Aggressive delta function. However, it avoids undesired frequent changes in TX power.

Figure 10:
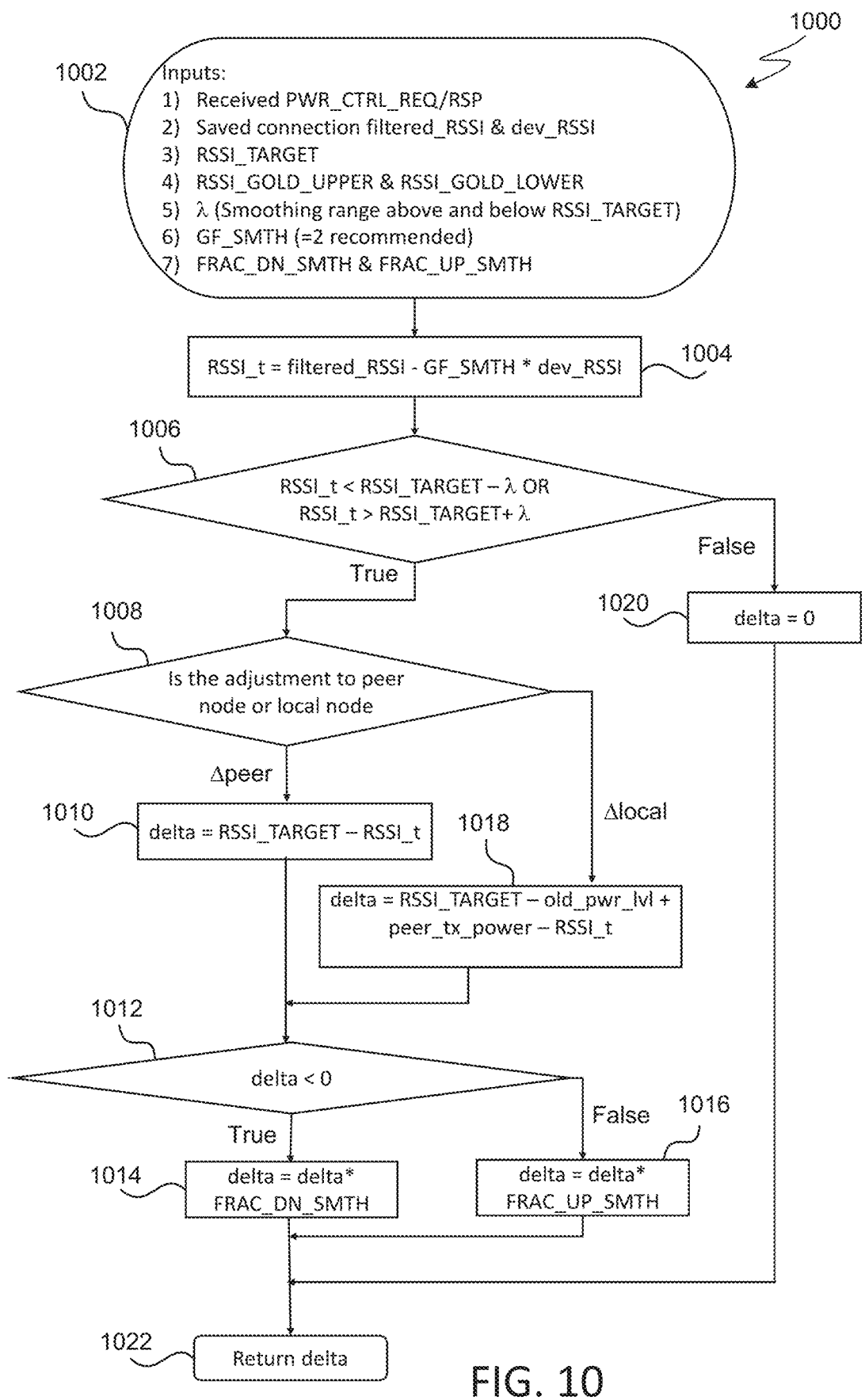
FIG. 10 shows a flow associated with determining a change in the transmit power of a BLE node, in accordance with another embodiment of the present disclosure.

FIG. 10 is an example of the delta power adjustment 1000 using Calc_Delat_Smoot_fcn(.) in accordance with another embodiment of the present disclosure. At 1002, the input parameters to the function are received. The parameters include filtered_RSSI and dev_RSSI that are saved in the connection record, RSSI_Target which is the target RSSI after the power adjustment, RSSI_Gold_Upper which is a tunable variable for the maximum RSSI in the golden range, RSSI_Gold_Lower which is a tunable variable for the minimum RSSI in the golden range, GF_SMTH which is a tunable Gaussian factor for the estimation of RSSI, Frac_Dn_SMTH which is a tunable fraction factor for decreasing the power adjustment, and Frac_Up_SMT which is a tunable fraction factor for increasing the power adjustment.

At 1004, parameter RSSI_t is determined using the following expression:

RSSI_$t$=filtered_RSSI-GF_SMTH*dev_RSSI

Thereafter, if at 1006 the following inequalities are determined to be true:

RSSI_$t$<RSSI_Target-λ; or

RSSI_$t$>RSSI_Target+λ then, a determination is made at 1008 as to whether the power adjustment is to be made at the local node itself ($\Delta_{local}$) or to the peer node ($\Delta_{peer}$). If at 1008, a determination is made that the power adjustment is to be applied to a peer node, then at 1010, delta is determined as shown below:

delta=RSSI_target-RSSI_$t$

Subsequently, if at 1012 delta is determined to be less than zero, then at 1014, delta is adjusted using the following expression:

delta=delta*Frac_Dn_SMTH

If at 1012, delta is determined not to be less than zero, then at 1016, delta is adjusted by the following expression:

delta=delta*Frac_Up_SMTH

If at 1008 it is determined that the power adjustment is to be made at a local node ($\Delta_{local}$), then at 1018 delta is determined as shown below:

delta=RSSI_target-old_pwr_lvl+peer_tx_power-RSSI_$t$

The flow then continues at 1012, as described above. If at 1006 it is determined that both of the following inequalities are true:

RSSI_$t$<RSSI_Target-λ; or

RSSI_$t$>RSSI_Target+λ then delta is set to 0 at 1020 and the power adjustment values are returned at 1020.

Figures 11A, 11B:
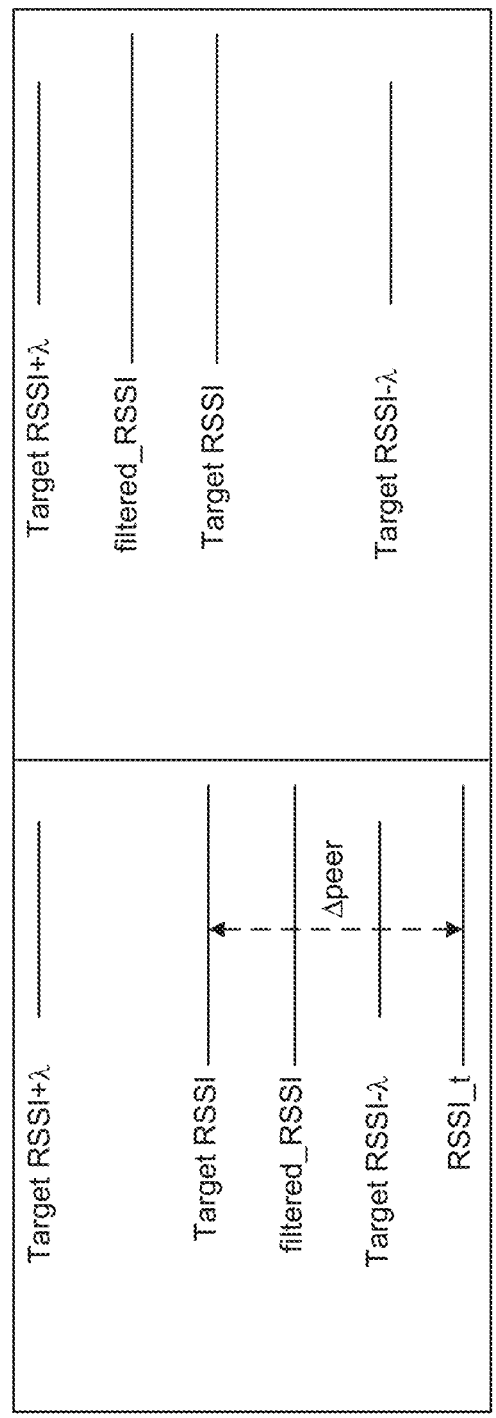
FIGS. 11A and 11B show target RSSI and corresponding transmit power changes determined in accordance with one embodiment of the present disclosure.

FIG. 11A shows a target RSSI and a corresponding delta calculated using the smooth delta function in accordance with one example. As is seen, the RSSI lower bound is outside the range defined by RSSI_Target-A and RSSI_t>RSSI_Target+λ and is greater than zero.

FIG. 11B shows a target RSSI and a corresponding delta calculated using the smooth delta function in accordance with another example. As is seen, the RSSI lower bound falls within the range defined by RSSI_Target-A and RSSI_t>RSSI_Target+λ. Therefore, delta is set to zero in this example.

In some embodiments, delta is calculated using step increases or decreases. Such embodiments avoid large instantaneous changes in the transmit power levels and are adapted to track the variance in the channel over multiple power control command/response messages. If the channel varies in an abrupt manner and experiences deep fades or high gains for a short time period and then returns to a typical response, the transmit power level is not changed unnecessarily. Thus, such embodiments change the power transmission towards a direction (up or down) that enhances the link quality.

However, such step increases/decreases step may involve making a large change if the estimate of the RSSI lower bound is outside of the RSSI golden range. In such cases, delta is calculated as described with reference to Calc_Delta_AGGRSV_fcn(.) and then multiplied by a fraction parameter FRAC_STEP, as described further below.

Figure 12:
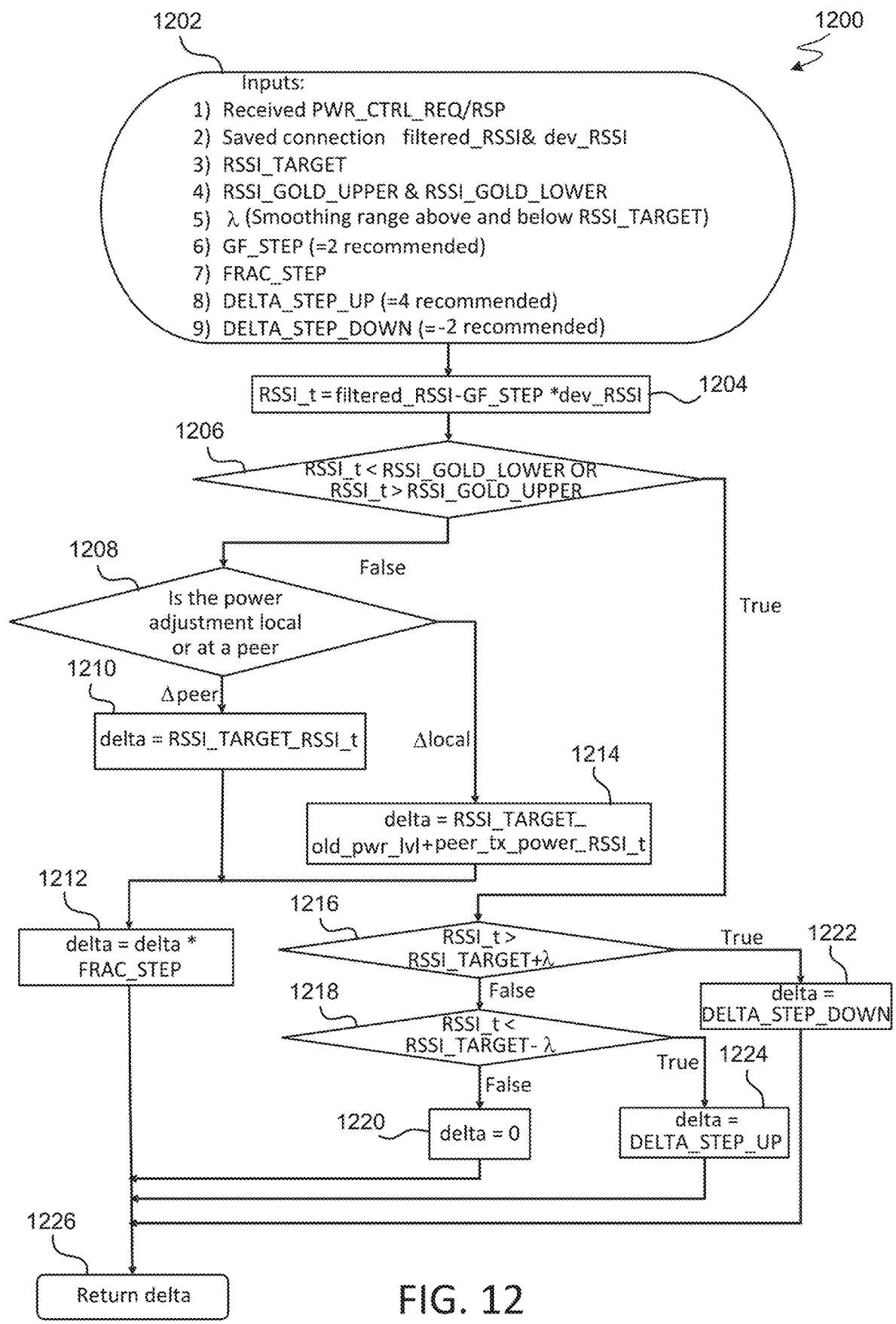
FIG. 12 shows a flow associated with determining a change in the transmit power of a BLE node, in accordance with another embodiment of the present disclosure.

FIG. 12 is an example of the delta power adjustment 1200 using Calc_Delat_Step_fcn(.), also referred to herein as step delta function, in accordance with another embodiment of the present disclosure. At 1202, the input parameters to the function are received. The parameters include, in part, filtere_RSSI and dev_RSSI that are saved in the connection record, RSSI_Target which is the target RSSI after the power adjustment, RSSI_Gold Upper which is a configurable variable for the maximum RSSI in the golden range, RSSI_Gold_Lower which is a configurable variable for the minimum RSSI in the golden range, GF STEP which is a tunable Gaussian factor for the estimation of RSSI, Frac_Step which is a tunable fraction factor for changing the power, Delta_Step_up which is a tunable step size for increasing the power adjustment, and Delta_Step_Down which is a tunable step size for decreasing the power adjustment.

At 1204, parameter RSSI_t is determined using the following expression:

RSSI_$t$=filtered_RSSI-GF_STEP*dev_RSSI

Thereafter, if at 1206 it is determined that both of the following inequalities are false:

RSSI_$t$<RSSI_Gold_Lower; or

RSSI_$t$>RSSI_Gold_Upper then, a determination is made at 1208 as to whether the power adjustment is to be made at the local node ($\Delta_{local}$) or at the peer node ($\Delta_{peer}$). If at 1208, a determination is made that the power adjustment is to be applied to a peer node, then at 1210, delta is determined as shown below:

delta=RSSI_target-RSSI_$t$

Subsequently, at 1212 delta is adjusted using the following expression:

delta=delta*Frac_Step where, as described above, Frac_Step is a tunable fractional factor for step adjustment of the power.

If at 1208, a determination is made that the power adjustment is to be applied to a local node, then at 1214, delta is determined as shown below:

delta=RSSI_target-old_pwr_lvl+peer_tx_power-RSSI_$t$ subsequent to which the delta computation continues at 1212.

If at 1206 it is determined that both of the following inequalities are false:

RSSI_$t$<RSSI_Gold_Lower; or

RSSI_$t$>RSSI_Gold_Upper then a determination is made at 1216 as to whether RSSI_t>RSSI_Target+λ

If at 1216, it is determined that the following expression is not true:

RSSI_$t$>RSSI_Target+λ and at 1218 it is determined that the following expression is not true $$RSSI\_t < RSSI\_Target - \lambda$$

then at 1220, delta is set to 0.

If at 1216, it is determined that the following expression is true:

$$RSSI\_t > RSSI\_Target + \lambda$$

then at 1222 delta is determined as shown below:

$$delta = delta\_step\_down$$

If at 1218 it is determined that the following expression is true:

$$RSSI\_t < RSSI\_Target - \lambda$$

then at 1224 delta is determined as shown below:

$$delta = delta\_step\_up$$

The results from 1212, 1220, 1224 and 1222 are returned using message at 1226. The delta calculation shown in FIG. 12 results in lowest variance in the transmit power. However, its channel tracking properties are desirable and provide suitable performance.

Embodiments described herein protect against making abrupt changes due to the filtering of RSSI values and use of an estimate of the lower bound of RSSI. The various functions and processes described herein vary in how aggressive the delta adjustment is to the variation in the channel between the two nodes and thus in the received RSSI. The aggressive delta function described with reference to FIG. 9 makes relatively bolder moves independent of whether a node is experiencing acceptable reception quality. The aggressive delta function seeks to relatively quickly compensate for the channel effect. However, the aggressive delta function applies fractional power adjustment so as not to result in very high RSSI variance. The smooth delta function causes change when the delta is outside of a defined (e.g., smoothing) range. The step delta function captures changes by moving in a direction (up or down) so as not to be affected by fast fading effects. The step delta function is geared towards capturing effects due to movement or effects such as obstruction of the signal between the two end-points. However, the step delta function can make relatively large adjustments if the channel condition results, for example, in extended deep fades.

Performance of the above embodiments of the present disclosure are tested under four different channel conditions including fading realizations and distances. A channel is synthesized that models propagation in the ISM 2.4 GHz band. For all the 4 channels, the path loss exponent is set 2.2 and Doppler speed is set to 1.1 m/sec. The Ricean factor and delay spread are varied as shown in Table I below. The parameters result in a highly variable channel response with a dominant line of sight (LoS) component. The Ricean K factor (RiceK) is the ratio of direct LoS component over non-LoS components in the received signal.

TABLE I

| Channel | RiceK | Speed (m/s) | Delay spread (ns) |
| --- | --- | --- | --- |
| 1 | 2.0 | 1.1 | 10 |
| 2 | 2.0 | 1.1 | 30 |
| 3 | 0.5 | 1.1 | 10 |
| 4 | 0.5 | 1.1 | 30 |

Multiple metrics are used to determine and compare the performance of the three different functions described with references to FIGS. 9, 10 and 12 to a setup that uses fixed power. Fixed power transmission poses the difficulty of determining the best power level in the first place. Two nodes with an average separation of, e.g., 5 meters will require much less power than the two nodes separated by, e.g., 50 meters under the same conditions/environment. Thus, the proper fixed power transmission for a given situation is often unknown. Many implementations use a fixed power level of 0 dBm as a value that may work well in various situations, and some may use estimates of the RSSI during the scanning/connection establishment to establish a proper power level to connect to a node that is advertising with a known fixed power level. However, such a power level may not be effective if one of the nodes changes position, or if the channel is subjected to deep fades. Such variations thus benefit from a dynamic power control, as described in accordance with embodiments of the present disclosure.

In the experiments described above, a BLE node starts transmitting at the lowest power level of −20 dBm. The power level is then adjusted to a proper value and continues to change so as to react to the channel variation. The adjustment behavior varies between different embodiments described herein. Each experiment is repeated at three or four fixed power levels. Then the dynamic power control is compared with the fixed power level that results in the best performance. Transmission at a fixed power level may be referred to herein as the reference fixed power (RFP). As described above, the reference fixed power is unknown to the devices participating in the connection.

Evolution Over Time

Figures 13A, 13B:
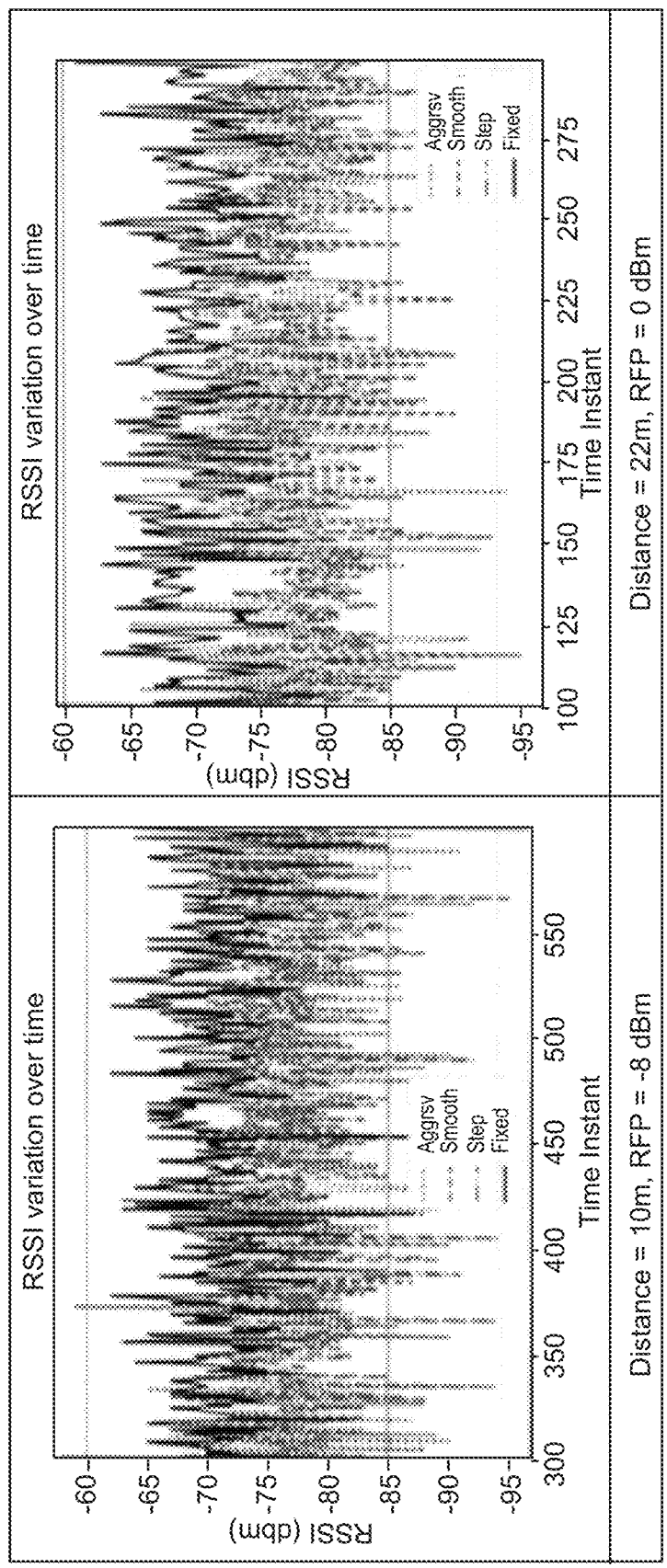
FIGS. 13A and 13B show examples of experimental values of the variations of RSSI as a function of time for different distances and reference fixed power levels, in accordance with another embodiment of the present disclosure.

FIGS. 13A and 13B respectively show the variation in the RSSI as function of time for channel model 2 of Table I when the three power control methods, as described above with reference to FIGS. 9-11, are applied as compared with a fixed power level of −8 dBm and 0 dBm for distance between the two peers of 10 and 22 meters. The fixed power level is considered the best overall fixed power from the discrete power levels of the transceiver. As can be seen from FIGS. 13A and 13B, the RSSI for the three power control methods are within the golden range (defined by a minimum golden RSSI of −85 dBm and a maximum golden RSSI of −60 dBm) with temporary spikes due to deep fades that cause the RSSI to go below the minimum golden RSSI. However, in all three cases, the RSSI remains above the sensitivity level of −95 dBm majority of times.

Figures 14A, 14B:
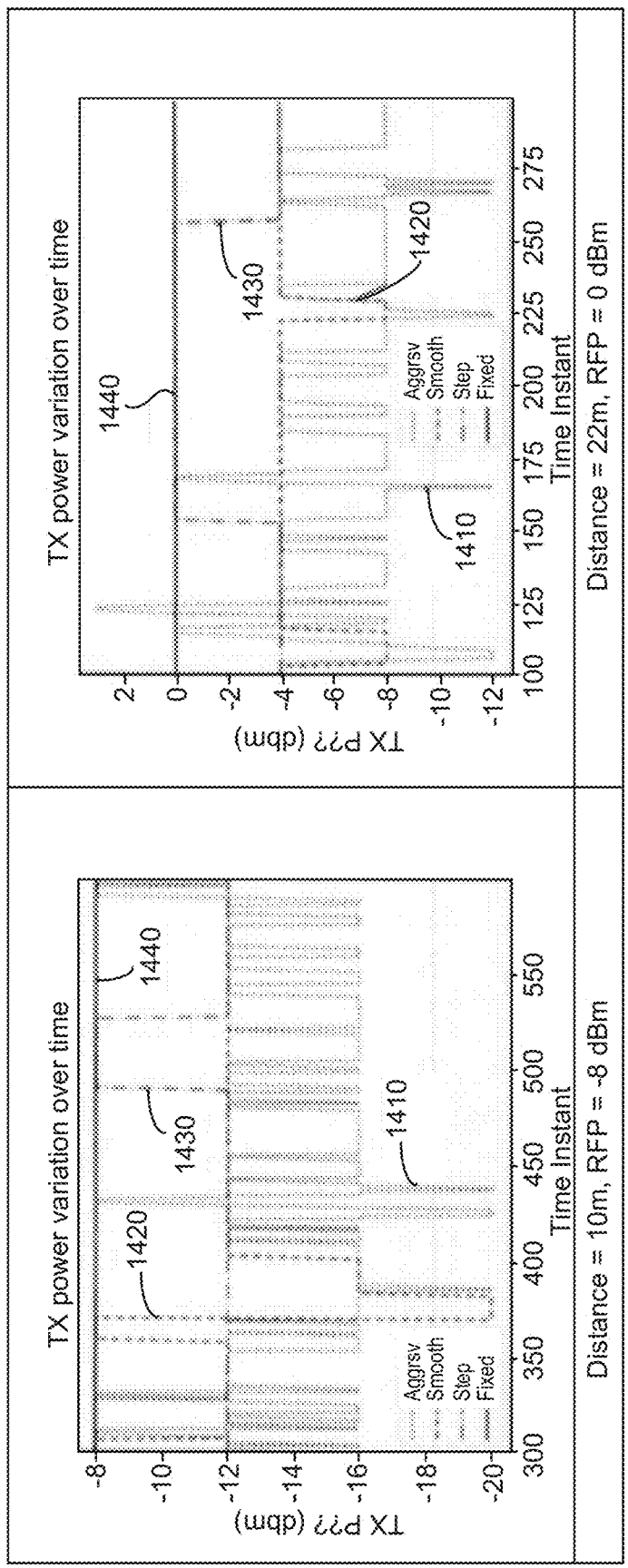
FIGS. 14A and 14B show the variations in the transmit power for the experimental data shown in FIGS. 13A and 13B, in accordance with another embodiment of the present disclosure.

FIGS. 14A and 14B show the variations in the transmit power over the same period as that shown in FIGS. 13A and 13B. The smooth and step delta functions, identified as 1420 and 1430 respectively, result in much lower changes in the transmit power. The aggressive delta function 1410 provides the most dynamic response to the channel variation and results in the largest variance in the RSSI and transmit power. FIG. 14A shows the results for a distance of 10 meters and RFP of −8 dBm. FIG. 14B shows the results for a distance of 22 meters and RFP of 0 dBm.

Reduction in Transmit Power

Figure 15:
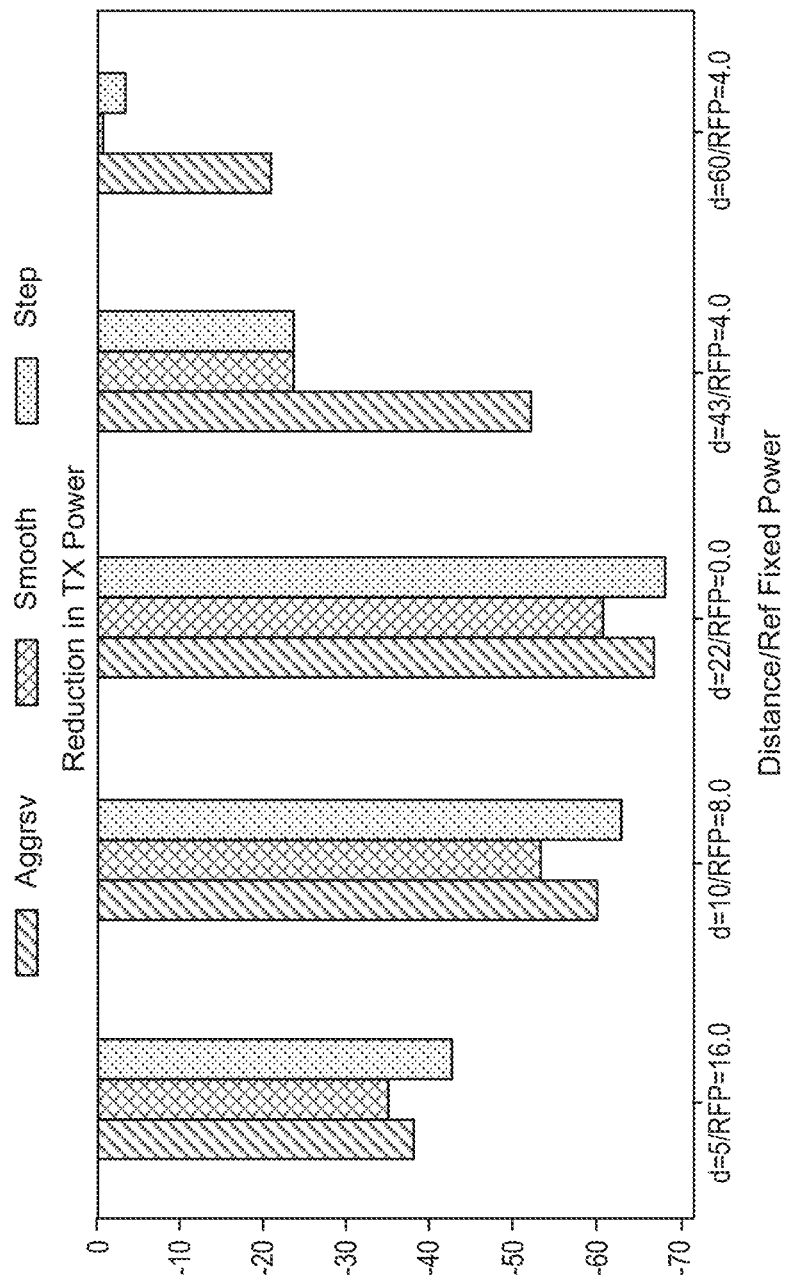
FIG. 15 shows the reduction in the transmit power achieved by the flows described with reference to FIGS. 9, 10 and 12 for a multitude of distances and reference fixed power levels, in accordance with another embodiment of the present disclosure.

Different metrics are used to evaluate the methods, the most critical of which is the reduction in the transmit power. FIG. 15 shows the variation in the transmit power achieved by the aggressive delta function, the smooth delta function, and the step delta function relative to the reference fixed power for distances of 5 m, 10 m, 22 m, 43 m, 60 m and corresponding RFPs of −16 dBm, −8 dBm, 0 dBm, 4 dBm and 4 dBm, respectively, as shown in FIG. 15. The reduction in the transmit power is calculated based on the values reported in milli-watts as this is the actual power used in the transceiver circuitry.

It is seen that the aggressive and smooth delta functions achieve the largest power reduction. The step delta function reduces power the most for small to medium distances, whereas the aggressive delta function reduces power the most in relatively larger distances.

Figure 16A:
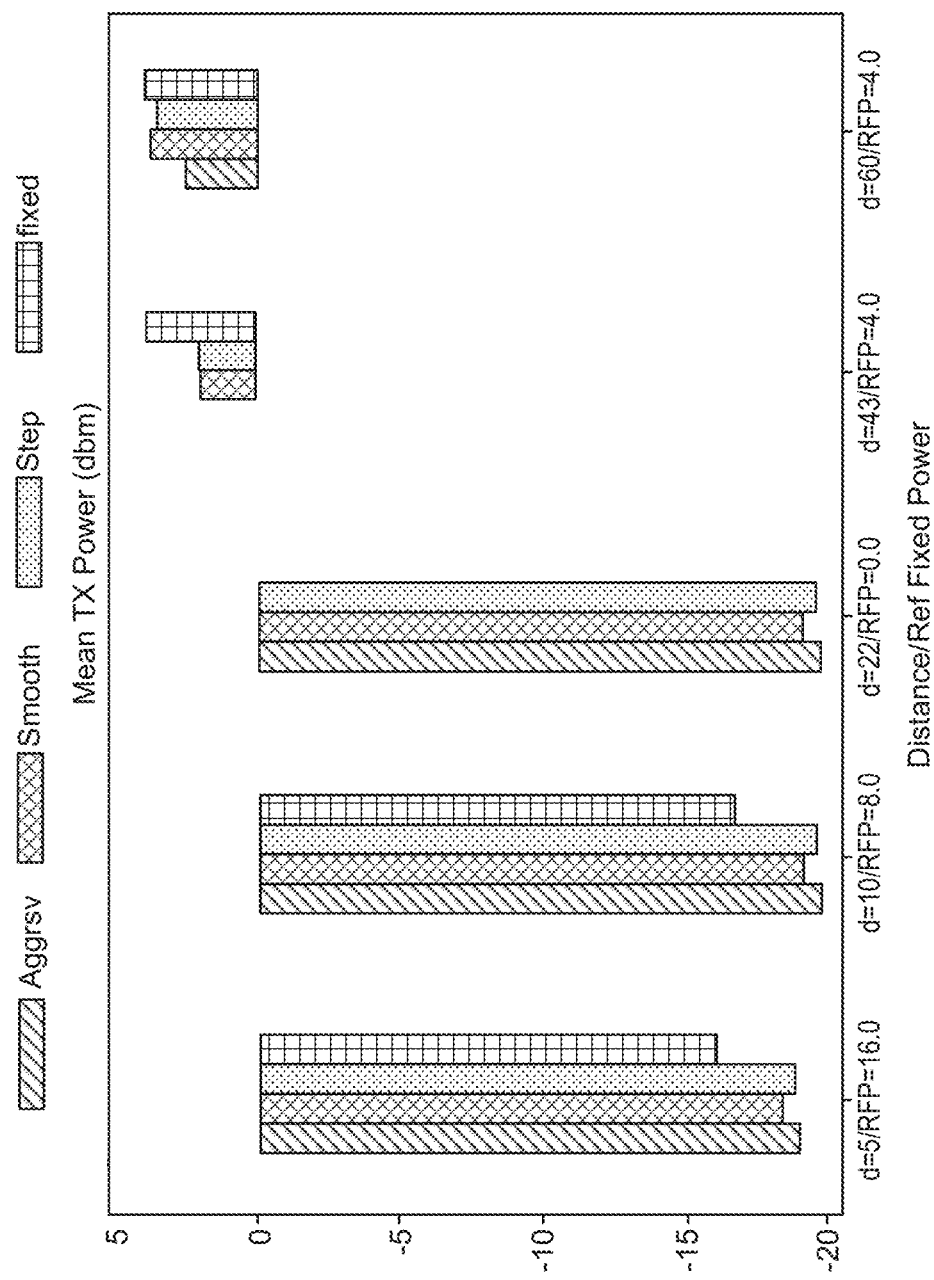
FIGS. 16A and 16B respectively show the average transmit power and the standard deviation of the transmit power for the same distances and reference fixed power levels as those shown in FIG. 15, in accordance with another embodiment of the present disclosure.
Figure 16B:
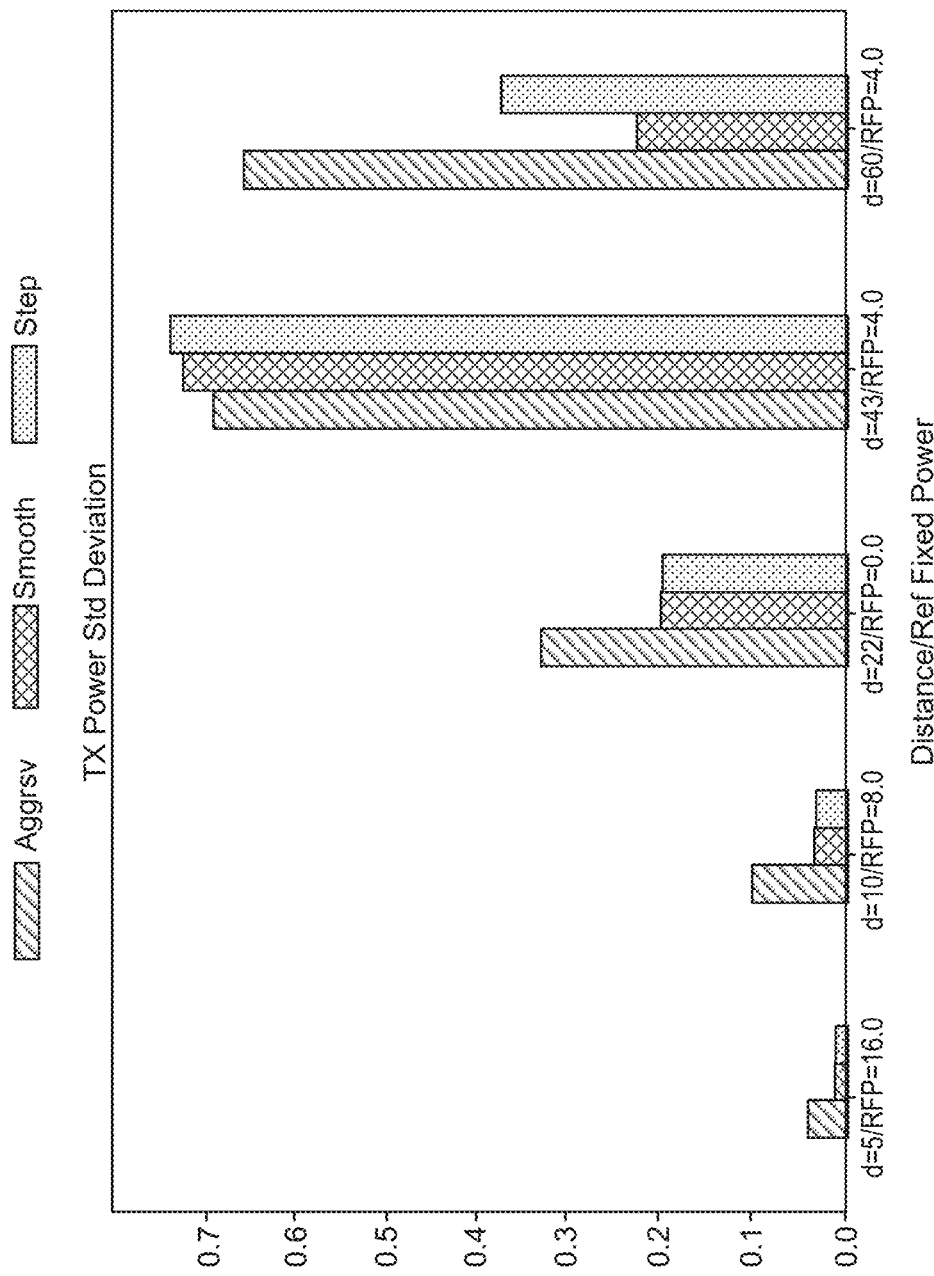

FIGS. 16A and 16B respectively show the average transmit power and the standard deviation (variance) of the transmit power relative to a reference fixed power level for the same five distances and RFPs shown in FIGS. 15. As is seen form FIGS. 16A and 16B, the aggressive delta function results in the highest variance.

RSSI Performance

Figure 17:
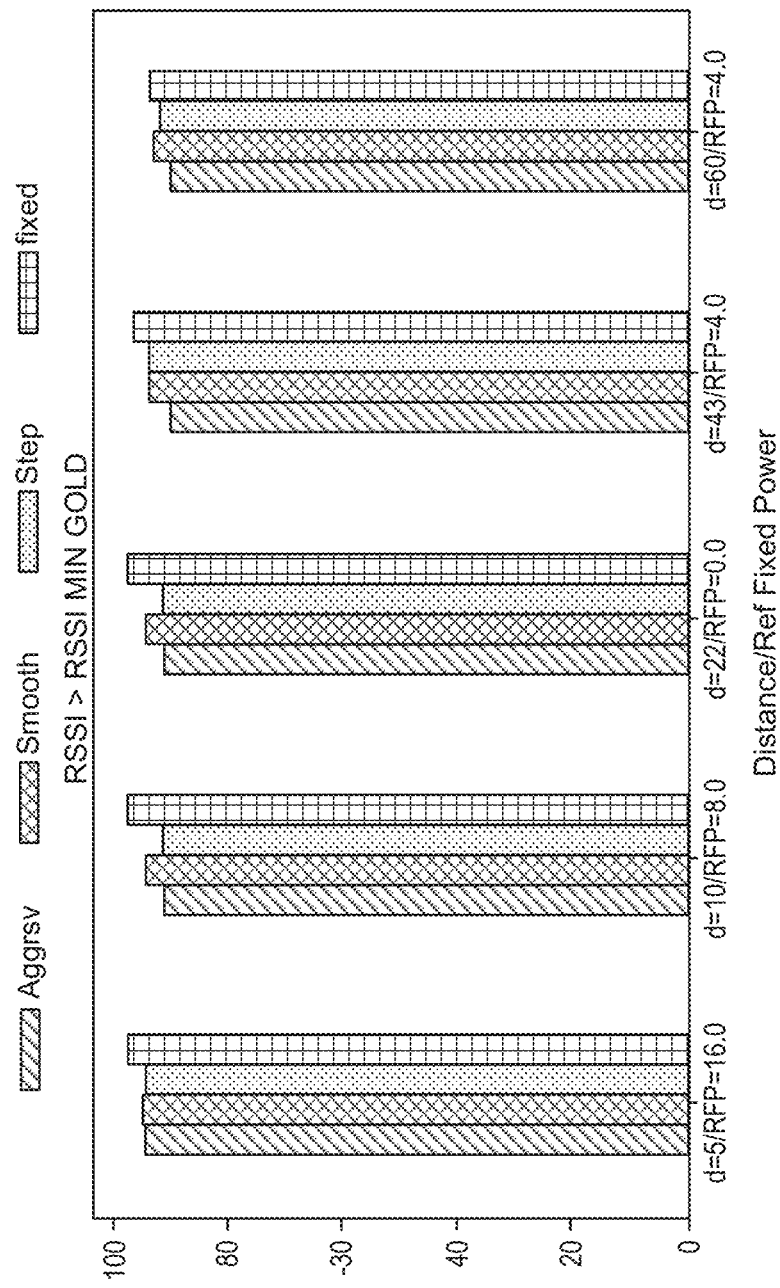
FIG. 17 shows the RSSI for the same distances and reference fixed power levels as those shown in FIG. 15, in accordance with another embodiment of the present disclosure.

FIG. 17 shows the RSSI for the same five different distances and RFPS as those shown in FIG. 15. For all the distances shown, the percentage of the RSSI values greater than the RSSI_MIN_Gold is 91% or higher for the three dynamic power control functions of Aggressive, Smooth and Step. The RSSI for the best fixed power level transmission at a given distance is 95%.

For the three dynamic power control functions of Aggressive, Smooth and Step, the minimum value of the percentage of RSSI values greater than the sensitivity level is 99.59% while for the fixed power it is 99.84%. This is a negligible drop given the substantial reduction of the transmit power of up to 60%. Therefore, a battery used to power a BLE node in accordance with embodiments of the present disclosure can last for double the time with almost the same RSSI link level performance.

Figure 18:
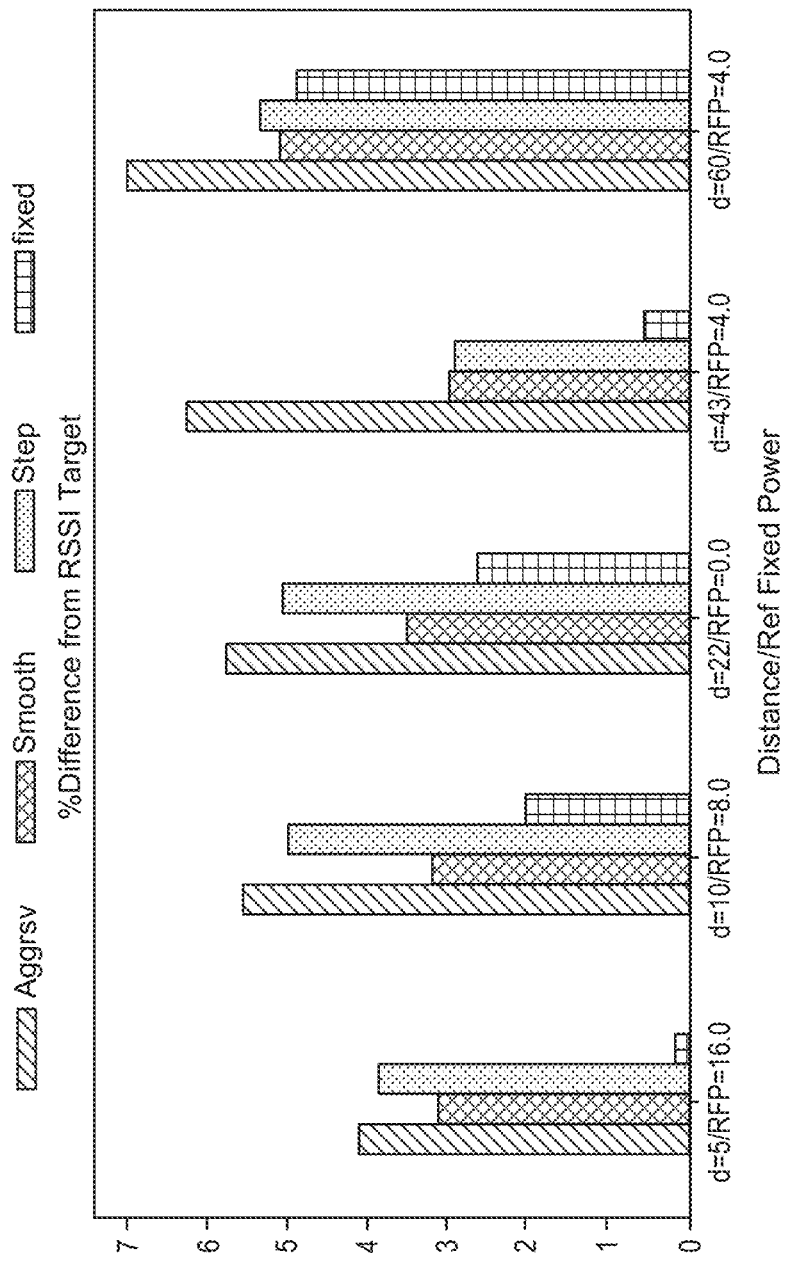
FIG. 18 shows the percent difference between the average RSSI, achieved on a link for each of the three flows described with reference to FIGS. 9, 10 and 12, and a target RSSI for the same distances and reference power levels as those shown in FIG. 15, in accordance with another embodiment of the present disclosure.

FIG. 18 shows the percent difference between the average RSSI, achieved on a link for each of three dynamic power control functions of Aggressive, Smooth and Step, and a target RSSI (TARGET_RSSI) for the same five different distances and RFPS as those shown in FIG. 15. The largest difference achieved by the dynamic power control functions is 7%. In practice, the RFP is unknown to the nodes. However, the RFP is closer to its target when using higher power. Multiple power levels are tested in the experiments until the RFP is obtained. When a node moves, or channel conditions vary substantially, the RFP will change.

Figure 19:
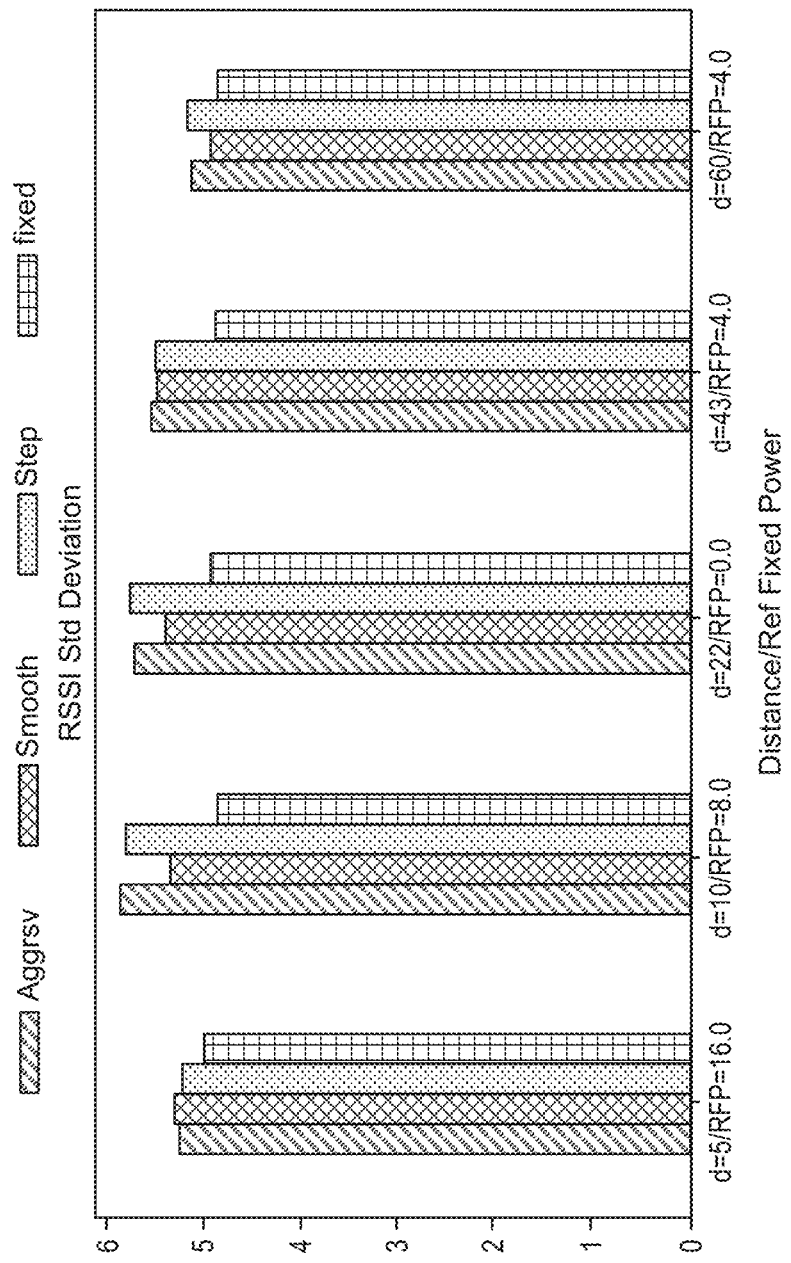
FIG. 19 shows the standard deviation of the RSSI achieved on a link for each of the three flows described with reference to FIGS. 9, 10 and 12, for the same distances and reference power levels as those shown in FIG. 15, in accordance with another embodiment of the present disclosure.

FIG. 19 shows the standard deviation of the RSSI achieved on a link for each of three dynamic power control functions of Aggressive, Smooth and Step described herein and for the same five different distances and RFPS as those shown in FIG. 15. The standard deviations for all three functions are substantially close to that of the fixed power level transmission. The smooth delta function is seen to result in the lowest RSSI variance among the three different functions.

Comparison in a Moving Environment

An experiment is also performed when the two end-points move within a relatively small area with a distance between the two end-points ranging between 8 and 12 meters. The experiment is repeated for the four different channel conditions shown in Table I. Tables 2 shows the mean RSSI, the standard deviation of the RSSI, the sensitivity level of the RSSI, and the percentage of the RSSI values greater than the RSSI_MIN_Gold for the three dynamic power control achieved by the Aggressive, Smooth and Step delta functions relative to fixed power at −8 dBm, −12 dBm, and −16 dBm.

TABLE 2

| RSSI | Aggrsv | Smooth | Step | Fixed@ −16 dBm | Fixed@ −12 dBm | Fixed @ −8 dBm |
| --- | --- | --- | --- | --- | --- | --- |
| Mean | −76.064392 | −74.455395 | −74.973947 | −78.262456 | −74.311842 | −70.388114 |
| StdDev | 5.876929 | 5.402525 | 5.759750 | 5.075765 | 5.129914 | 5.177411 |
| % > Sensitivity | 99.74 | 99.89 | 99.80 | 99.56 | 99.86 | 99.98 |
| % > Min Gold | 92.26 | 95.16 | 93.83 | 88.59 | 95.89 | 98.66 |

Tables 3 shows the mean transmit power (TxPwr), the standard deviation of the transmit power, and percent reduction in the transmit compared to −8 dbM fixed power transmission for the same four channel conditions as those shown in Table I for each of Aggressive, Smooth, and Step functions.

TABLE 3

| TxPwr | Aggressive | Smooth | Step |
|---|---|---|---|
| Mean | −13.799325 | −12.071404 | −12.590175 |
| StdDEv | 3.715498 | 2.755563 | 2.967214 |
| % Reduction compared to −8 dBm | −56.5681 | −52.1972 | −55.9335 |

As is seen from the above results, embodiments of the present disclosure maintain the RSSI above the sensitivity level close to 100% and above the MIN_GOLD_RSSI level at least 92% of the times. The reduction in power compared to the −8 dBm is at least 52%.

Figure 20:
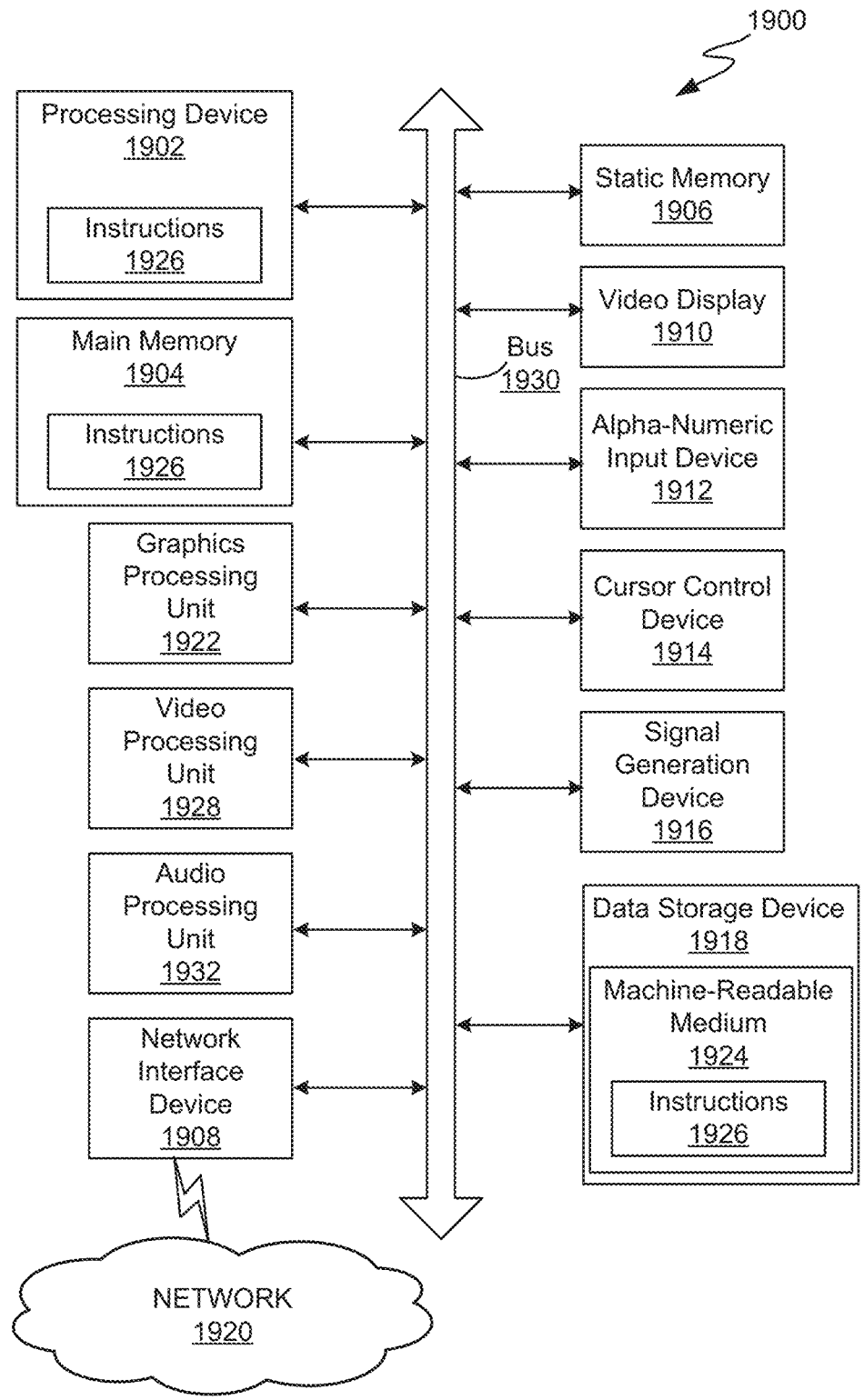
FIG. 20 show a diagram of an example of a computer system in which embodiments of the present disclosure may operate.

FIG. 20 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1900 includes a processing device 1902, a main memory 1904 (e.g., read-only memory (ROM), flash memory, dynamic random access memory (DRAM) such as synchronous DRAM (SDRAM), a static memory 1906 (e.g., flash memory, static random access memory (SRAM), etc.), and a data storage device 918, which communicate with each other via a bus 1930.

Processing device 1902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1902 may also be one or more special-purpose processing devices such as an application specific integrated circuit (ASIC), a field programmable gate array (FPGA), a digital signal processor (DSP), network processor, or the like. The processing device 1902 may be configured to execute instructions 926 for performing the operations and steps described herein.

The computer system 1900 may further include a network interface device 1908 to communicate over the network 1920. The computer system 1900 also may include a video display unit 1910 (e.g., a liquid crystal display (LCD) or a cathode ray tube (CRT)), an alphanumeric input device 1912 (e.g., a keyboard), a cursor control device 1914 (e.g., a mouse), a graphics processing unit 1922, a signal generation device 1916 (e.g., a speaker), graphics processing unit 1922, video processing unit 1928, and audio processing unit 1932.

The data storage device 1918 may include a machine-readable storage medium 1924 (also known as a non-transitory computer-readable medium) on which is stored one or more sets of instructions 1926 or software embodying any one or more of the methodologies or functions described herein. The instructions 1926 may also reside, completely or at least partially, within the main memory 1904 and/or within the processing device 1902 during execution thereof by the computer system 1900, the main memory 1904 and the processing device 1902 also constituting machine-readable storage media.

In some implementations, the instructions 1926 include instructions to implement functionality corresponding to the present disclosure. While the machine-readable storage medium 1924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for dynamically adjusting transmit power of a first device that is in communication with a second device using a wireless communications protocol, the method comprising:
   determining, by the second device, a received signal strength indication (RSSI) associated with a signal received from the first device;
   determining, by the second device, a first amount of power adjustment for the first device in accordance with the determined RSSI;
   transmitting the first amount of power adjustment from the second device to the first device;
   determining, by the first device, a second amount of power adjustment for the first device in accordance with the RSSI and the first amount of power adjustment; and
   changing a transmit power of the first device in accordance with the second amount of power adjustment.

2. The method of claim 1 wherein the RSSI is filtered using an exponential moving average filtering function.

3. The method of claim 1 further comprising:
   transmitting the first amount of power adjustment from the second device to the first device via one or more messages defined by the wireless communications protocol.

4. The method of claim 1 further comprising:
   defining a Gaussian distribution for the RSSI; and
   determining the first amount of power adjustment and the second amount of power adjustment further in accordance with a standard deviation of the Gaussian distributed RSSI.

5. The method of claim 1 further comprising:
   transmitting a message from the first device to the second device, wherein the message indicates the second amount of power adjustment.

6. The method of claim 1 further comprising:
   determining, by the first device, a maximum decrease in transmit power of the first device that is acceptable to the first device; and
   transmitting to the second device the determined maximum decrease in transmit power of the first device.

7. The method of claim 6 further comprising:
   determining, by the first device, a third amount of power adjustment for the second device in accordance with the maximum decrease in the transmit power of the first device; and
   transmitting the third amount of power adjustment from the first device to the second device.

8. The method of claim 7 further comprising:
   varying a transmit power of the second device in accordance with the third amount of power adjustment and the changed transmit power of the first device.

9. The method of claim 6 further comprising:
   filtering the RSSI using an exponential moving average filtering function to generate a filtered RSSI; and
   setting the maximum decrease in transmit power of the first device to zero if the filtered RSSI is less than or equal to a predefined value.

10. The method of claim 1 further comprising:
    determining, by the first device, the second amount of power adjustment further in accordance with a variable fractional factor.

11. A wireless communication device comprising a communications controller, a memory, and a power control system, the wireless communication device configured to:
    receive, from a peer wireless communication device (peer device), a first amount of power adjustment to be made to transmit power of the wireless communication device, the first amount of power determined by the peer device in accordance with a received signal strength indication (RSSI) associated with a signal the peer device receives from the wireless communication device;
    determine a second amount of power adjustment for the wireless communication device in accordance with the RSSI and the first amount of power adjustment; and
    change the transmit power of the wireless communication device in accordance with the second amount of power adjustment.

12. The wireless communication device of claim 11 wherein the RSSI is filtered using an exponential moving average filtering function.

13. The wireless communication device of claim 11 wherein the wireless communication device is further configured to:
    receive the first amount of power adjustment from the peer device via one or more messages defined by a communications protocol in conformity with which the wireless communication device and the peer device communicate.

14. The wireless communication device of claim 11 wherein the wireless communication device is further configured to:
define a Gaussian distribution for the RSSI; and
determine the second amount of power adjustment further in accordance with a standard deviation of the Gaussian distributed RSSI.

15. The wireless communication device of claim 11 wherein the wireless communication device is further configured to:
transmit a message to the peer device indicating the second amount of power adjustment.

16. The wireless communication device of claim 11 wherein the wireless communication device is further configured to:
determine a maximum decrease in transmit power of the wireless communication device that is acceptable to the peer device and communicated to the peer device; and
transmit to the peer device the maximum acceptable decrease in transmit power of the peer device when transmitting to the wireless communication device.

17. The wireless communication device of claim 16 wherein the wireless communication device is further configured to:
determine a third amount of power adjustment for the peer device in accordance with the maximum decrease in transmit power of the wireless communication device; and
transmit the third amount of power adjustment to the peer device.

18. The wireless communication device of claim 17 wherein the wireless communication device is further configured to:
cause a transmit power of the peer device to vary in accordance with the third amount of power adjustment and the changed transmit power of the wireless communication device.

19. The wireless communication device of claim 17 wherein the wireless communication device is further configured to:
determine the second amount of power adjustment further in accordance with a variable fractional factor.

20. The wireless communication device of claim 16 wherein the wireless communication device is further configured to:
set the maximum decrease in the transmit power of the wireless communication device to zero if a filtered RSSI is less than or equal to a predefined value.

* * * * *